United States Patent [19]

Ohtani

[11] Patent Number: 5,608,823
[45] Date of Patent: Mar. 4, 1997

[54] IMAGE READING APPARATUS FOR CORRECTING DENSITY LEVELS

[75] Inventor: Kazuo Ohtani, Kodaira, Japan

[73] Assignee: Canon Kabushiki Kaisha, Tokyo, Japan

[21] Appl. No.: 327,807

[22] Filed: Oct. 24, 1994

Related U.S. Application Data

[63] Continuation of Ser. No. 44,895, Apr. 7, 1993, abandoned, which is a continuation of Ser. No. 592,344, Oct. 3, 1990, abandoned.

[30] Foreign Application Priority Data

Oct. 4, 1989 [JP] Japan .................................... 1-257845
Nov. 30, 1989 [JP] Japan .................................... 1-309367
Dec. 14, 1989 [JP] Japan .................................... 1-322659

[51] Int. Cl.$^6$ .................................................. G06K 9/38
[52] U.S. Cl. ................................................... 382/271
[58] Field of Search ............................ 382/18, 41, 50, 382/51, 192, 276, 270, 271; 358/456, 457, 461; G06K 9/46, 9/56, 9/36, 9/38; H04N 1/04, 1/40

[56] References Cited

U.S. PATENT DOCUMENTS

| | | | |
|---|---|---|---|
| 4,791,678 | 12/1988 | Iwase et al. | 382/51 |
| 4,792,979 | 12/1988 | Nomura et al. | 382/51 |
| 4,839,696 | 6/1989 | Ohtani | 355/218 |
| 4,907,286 | 3/1990 | Yamada | 382/51 |

*Primary Examiner*—Jose L. Couso
*Attorney, Agent, or Firm*—Fitzpatrick, Cella, Harper & Scinto

[57] ABSTRACT

An image reading apparatus includes an image sensing unit for photoelectrically reading an original image, and outputting an image signal, a converter unit for converting the image signal from the image sensing unit into density data representing density levels of a plurality of steps, a detection unit for detecting frequencies of appearance in units of density levels of the density data from the converter unit, and a correction unit for correcting the density levels expressed by the density data from the converter unit on the basis of the frequencies of appearance detected by the detection unit.

11 Claims, 28 Drawing Sheets

← DOT No.

FIG.20A
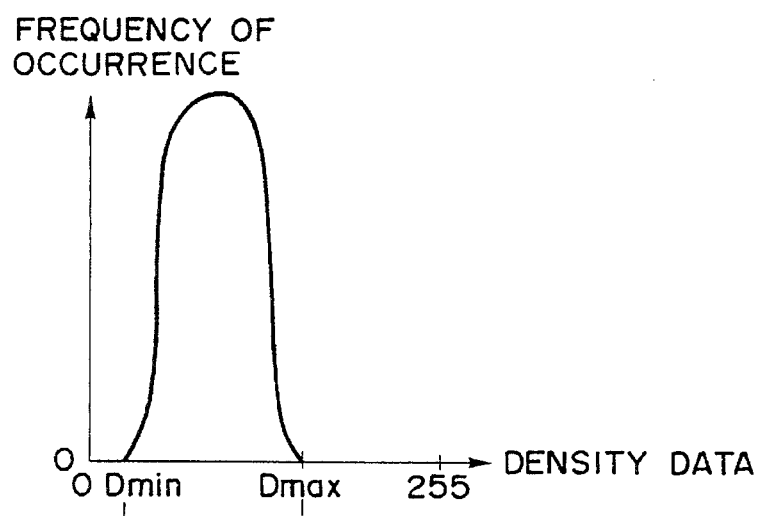
FIG.20B    FIG.20C
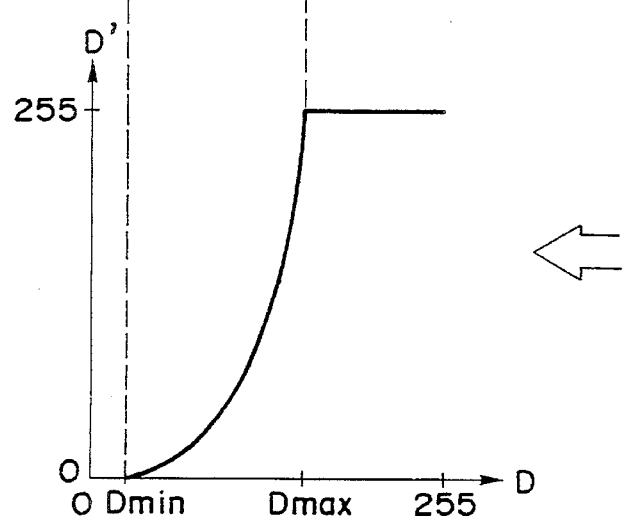 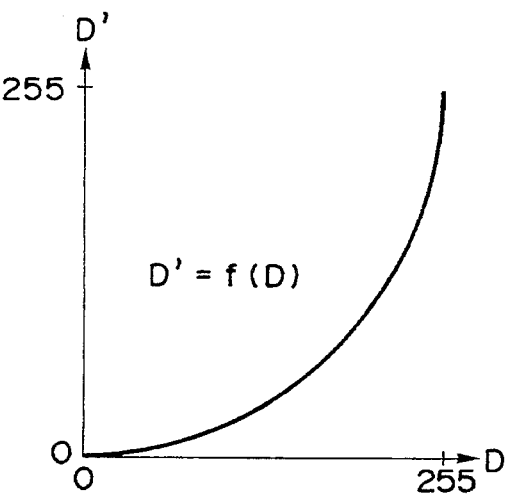

IMAGE READING APPARATUS FOR CORRECTING DENSITY LEVELS

This application is a continuation, of application Ser. No. 08/044,895 filed Apr. 7, 1993, now abandoned, which is a continuation application of Ser. No. 07/592,344 filed Oct. 3, 1990, which is now abandoned.

BACKGROUND OF THE INVENTION

1. Field of the Invention

The present invention relates to an image reading apparatus for scanning and exposing an original image, and photoelectrically converting the image using an image sensing element and, more particularly, to an apparatus for reading a tone image such as a photograph.

2. Related Background Art

Conventional image reading apparatuses using image sensing elements such as CCDs have been available.

FIG. 1 is a block diagram of an image reading apparatus of this type. In FIG. 1, light reflected by, e.g., an original placed on an original table, or projection light through a microfilm is scanned and photoelectrically converted by an image sensing unit 61 using an image sensing element such as a CCD, and an electrical signal is quantized into multi-value data by an A/D converter unit 62.

The multi-value quantized data is supplied to the next tone processing unit 63, and is converted by, e.g., a dither method, into binary data (e.g., 1/0) which allows reproduction of a tone image. The binary data is output from the reading apparatus.

The arrangement shown in FIG. 1 faithfully reads an original image having a low contrast. Therefore, output data is reproduced to have a low contrast as in the original image, thus posing a problem.

As shown in FIG. 2, another arrangement has been proposed wherein a γ correction unit 64 is arranged between the A/D converter unit 62 and the tone processing unit 63.

In FIG. 2, multi-value quantized data output from the A/D converter unit 62 is input to the next γ correction unit 9 to correct a difference between photoelectric conversion characteristics of the image sensing element such as a CCD and human tone visual recognition characteristics. FIGS. 3, 4, and 5 show this state.

FIG. 3 represents photoelectric conversion characteristics of the image sensing element. In FIG. 3, the abscissa corresponds to a scale of density which linearly changes with respect to human tone visual recognition characteristics. In this manner, since the photoelectric conversion characteristics of the image sensing element are normally different from the human tone visual recognition characteristics, a γ correction table 65 shown in FIG. 4 is used to perform correction (γ correction), so that an output D' linearly changes with respect to the human tone visual recognition characteristics, as shown in FIG. 5.

The γ-corrected signal is supplied to the next tone processing unit 63, and is converted by, e.g., a dither method, into binary data (e.g., 1/0) which allows reproduction of a tone image, as shown in FIG. 2. The binary data is output from the reading apparatus.

The arrangement shown in FIG. 2 faithfully outputs an original image having a low contrast. Therefore, output data is reproduced to have a low contrast as in the original image, thus posing a problem.

As shown in FIG. 6, still another arrangement which has a tone processing unit 67 using a dither method to reproduce a pseudo halftone image on the basis of multi-value quantized data from the A/D converter unit 62 has been proposed.

Multi-value quantized data obtained by multi-value quantization by the A/D converter unit 62 is supplied to the tone processing unit 67, and is converted by, e.g., a dither method, into binary data (e.g., 1/0) which allows reproduction of a tone image. More specifically, dot patterns having dot densities proportional to density data of an image are sequentially read out from a dither pattern memory 66 storing dot patterns shown in FIG. 7, and the readout patterns are output.

However, a tone of an original whose image entirely has a low density and a low contrast, as shown in FIG. 39, or of an original whose image entirely has a high density and a low contrast, as shown in FIG. 40 is faithfully reproduced. Therefore, a reproduced image has a low contrast as in the original image.

The above-mentioned problems also occur when an image of a normal document, book, or the like is read, and are conspicuous when an image recorded on a film is to be read.

A density and a contrast of an image recorded on a film largely depend on various conditions such as photographing conditions, development conditions, and the like as well as a type of film. Therefore, this implies that images have quite different densities and contrasts in units of films to be read.

Therefore, when an image recorded on a film is to be read, reading cannot be satisfactorily attained unless the above-mentioned problems are solved.

SUMMARY OF THE INVENTION

The present invention has been made in consideration of the above situation, and has as its object to satisfactorily read an image having an unbalanced density distribution, e.g., an image having an extremely higher or lower density level as a whole and an image having a low contrast.

It is another object of the present invention to provide an image reading apparatus which can obtain a high-contrast image from a low-contrast original image.

It is still another object of the present invention to provide an image reading apparatus which can obtain a high-contrast tone image from a low-contrast original image without impairing an original tone.

It is still another object of the present invention to provide an image reading apparatus suitable for reading an image recorded on a film.

The above and other objects and features of the present invention will be apparent from the following description.

BRIEF DESCRIPTION OF THE DRAWINGS

FIGS. 20A to 20C and 22A to 22C are graphs for explaining tone correction according to the fourth embodiment;

DETAILED DESCRIPTION OF THE PREFERRED EMBODIMENTS

The preferred embodiments of the present invention will be described in detail hereinafter.

First Embodiment

Figure 1:
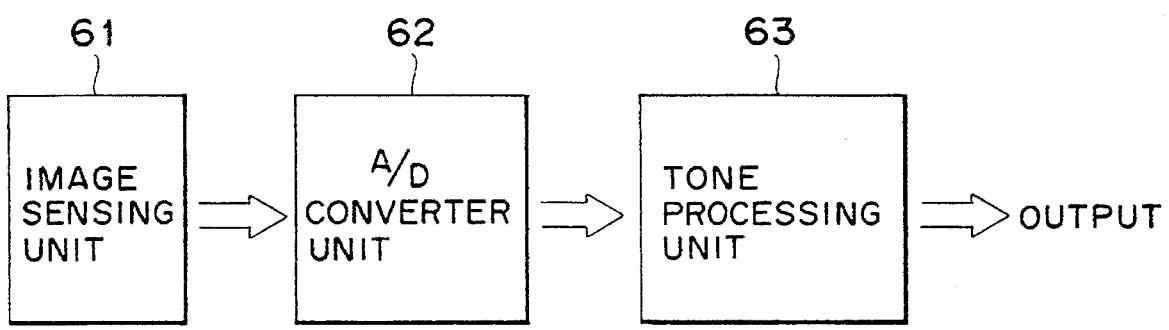
FIGS. 1, 2, and 6 are block diagrams showing arrangements of conventional image reading apparatuses.
Figure 2:
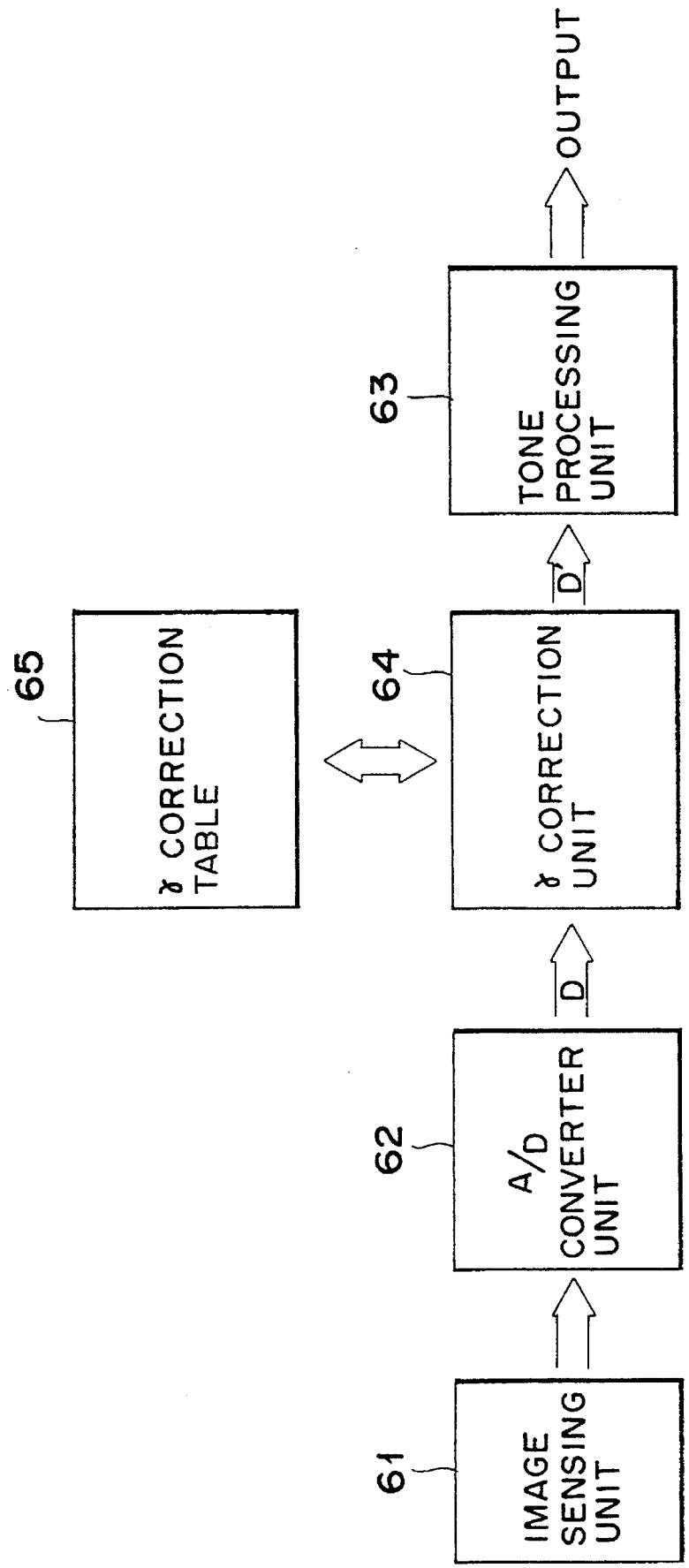
Figure 3:
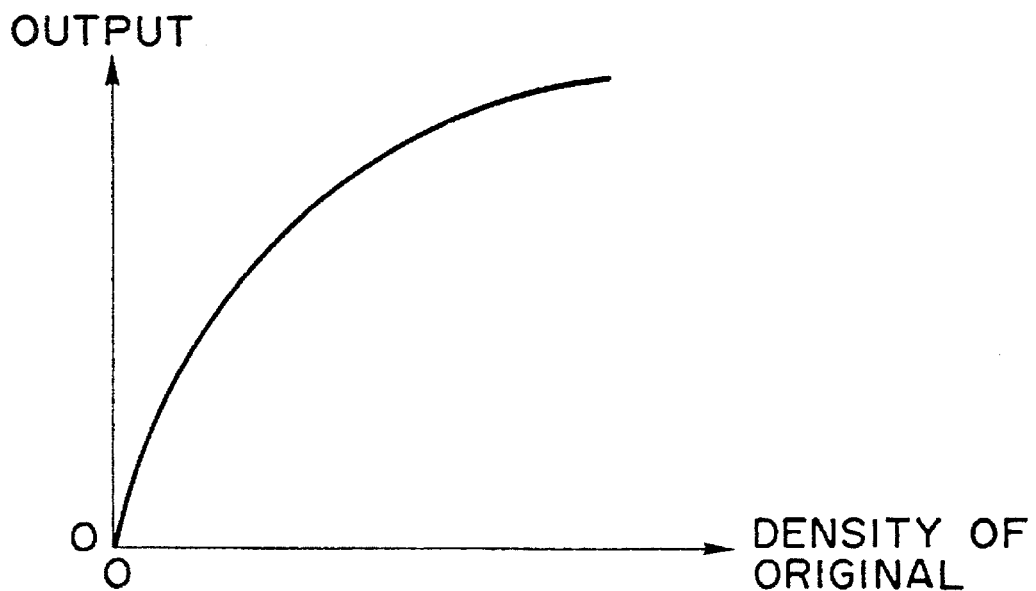
FIGS. 3, 4, and 5 are graphs showing conversion operations by the arrangement shown in FIG. 2.
Figure 4:
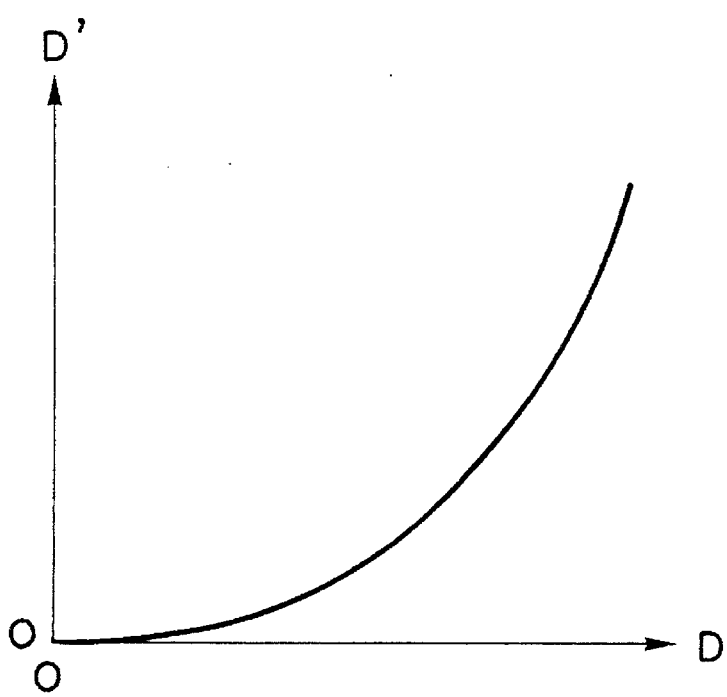
Figure 5:
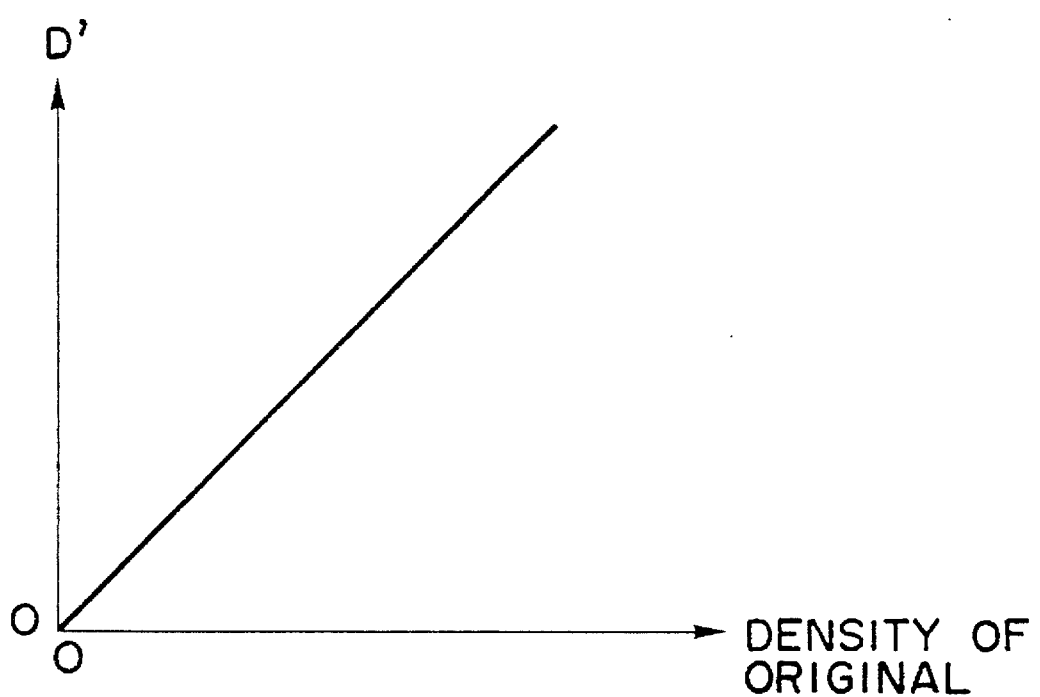
Figure 6:
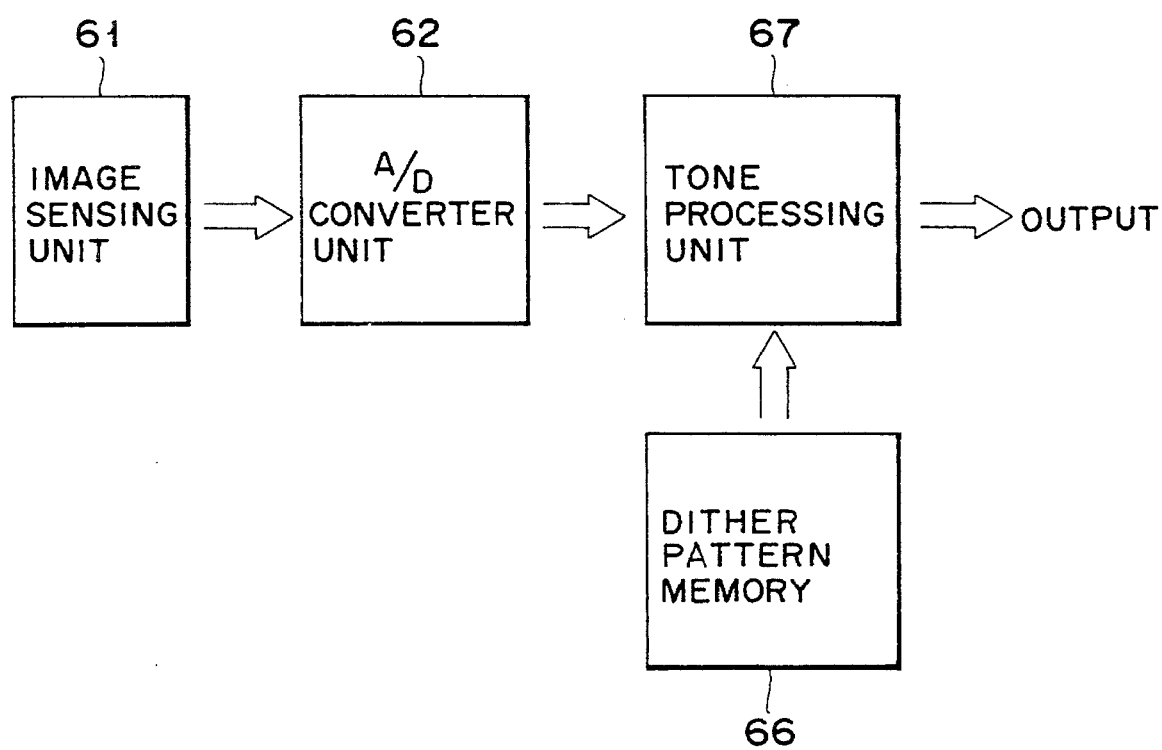
Figure 7:
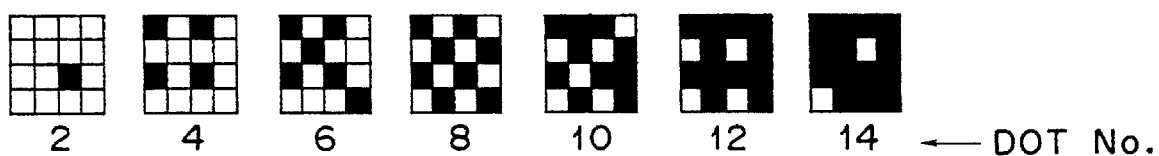
FIG. 7 shows dither patterns.
Figure 8:
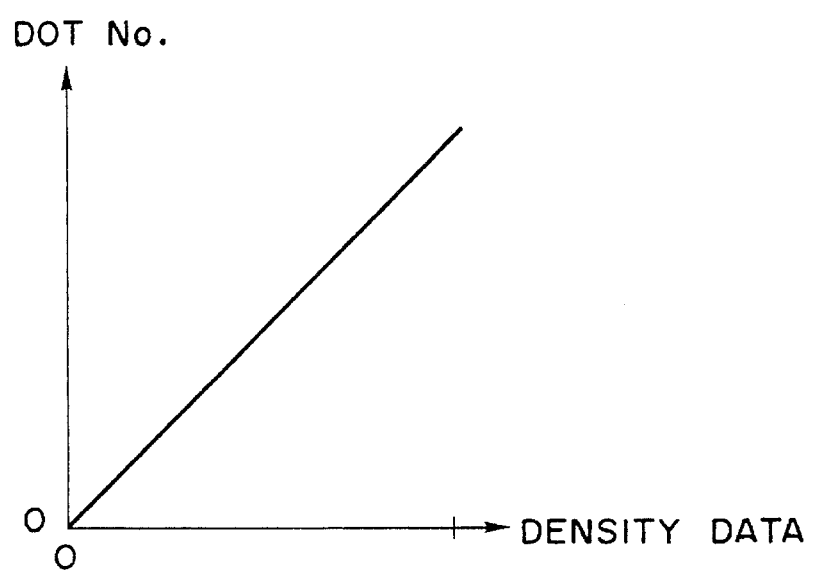
FIG. 8 is a graph showing a conversion operation by the arrangement shown in FIG. 6.
Figure 9:
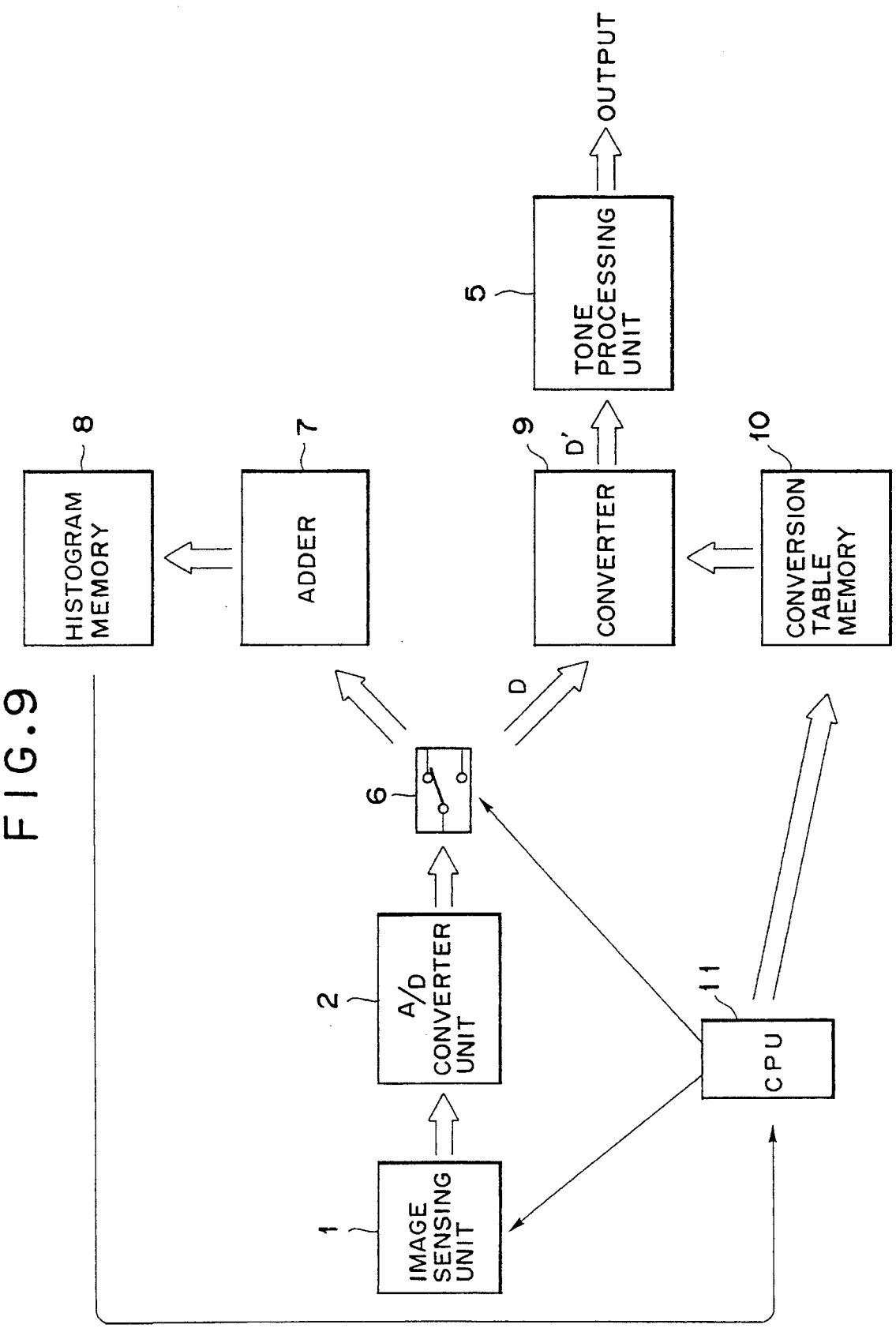
FIG. 9 is a block diagram showing the first embodiment of the present invention.

FIG. 9 is a block diagram of the first embodiment of the present invention. In the embodiment shown in FIG. 9, a scanning operation for detecting frequencies of appearance of image densities (to be referred to as prescanning operation hereinafter) is performed prior to a scanning operation for outputting image data.

Control for scanning an original is performed by a CPU 11 by driving a scanning system and an exposure system (neither are shown) for guiding image light from an original to an image sensing unit 1. Scanning and exposure arrangements and control are known to those who are skilled in the art, and a detailed description thereof will be omitted.

An analog image signal obtained by photoelectrically converting image light from an original by the image sensing unit 1 including an image sensing element such as a CCD is quantized into multi-value data by an A/D converter unit 2. Note that the A/D converter unit 2 outputs white level as a value "0", and outputs black level as a value "255". In the prescanning mode, a switch 6 is set at an adder 7 side under the control of the CPU 11.

Figure 10:
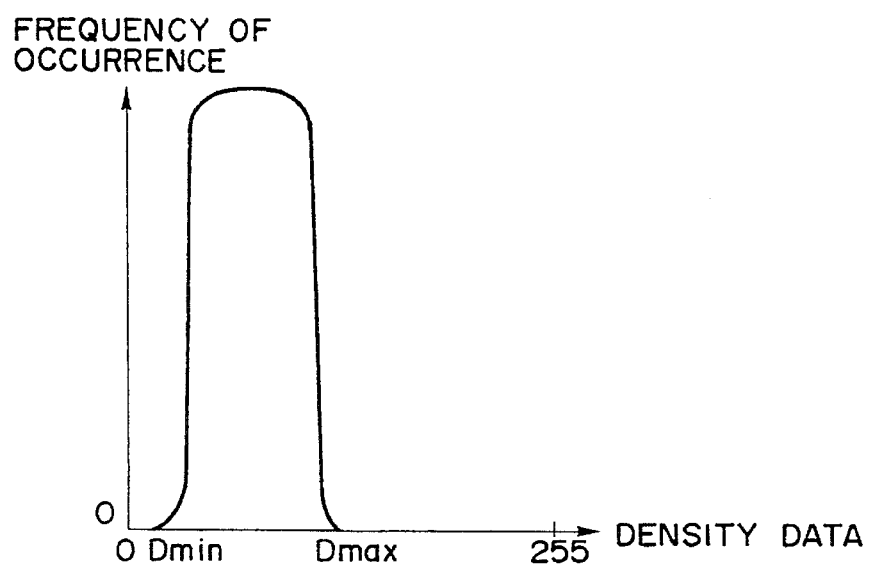
FIGS. 10 to 15 are graphs showing operations according to the first embodiment of the present invention.
Figure 13:
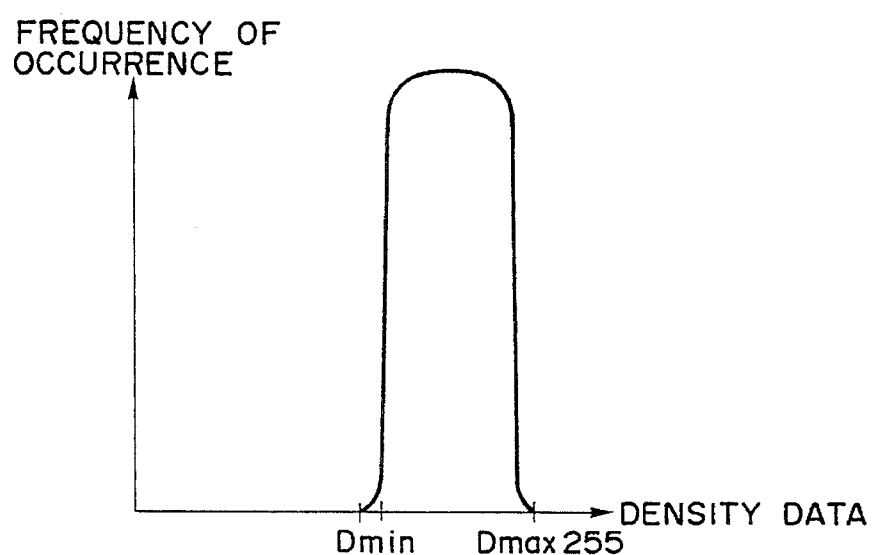

The multi-value quantized data is input to the adder 7 to count frequencies of appearance in units of densities (to be referred to as a density histogram hereinafter). The count value is stored in a histogram memory 8. FIGS. 10 and 13 show contents of the histogram memory 8. FIG. 10 shows a density histogram of an image which entirely has a low density and a low contrast. FIG. 13 shows a density histogram of an image which entirely has a high density and a low contrast.

Figure 11:
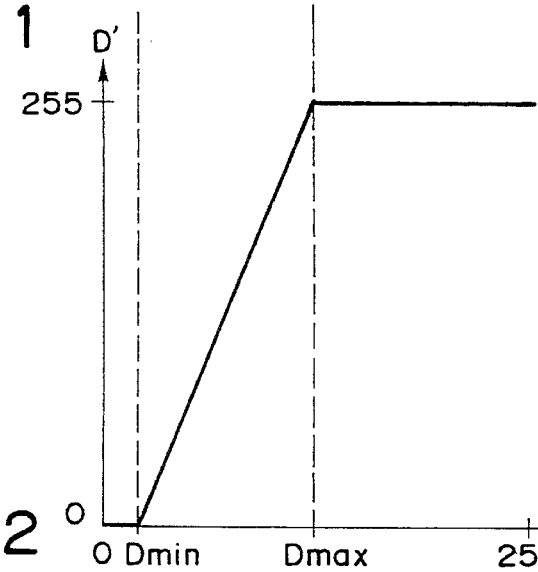
Figure 14:
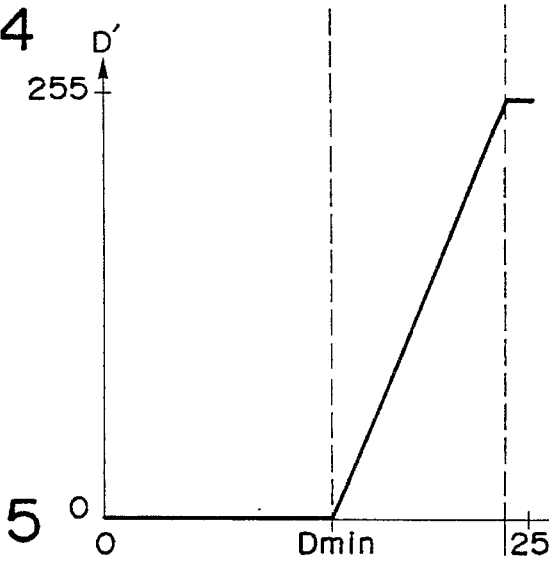

Upon completion of the prescanning operation, the CPU 11 looks up the content of the histogram memory 8, and outputs a conversion table to a conversion table memory 10. FIGS. 11 and 14 show this state.

More specifically, as shown in FIGS. 10 and 13, if minimum and maximum densities appearing in an original are respectively represented by $D_{min}$ and $D_{max}$, the CPU 11 looks up the histogram memory 8 to detect these $D_{min}$ and $D_{max}$, and calculates a conversion table for performing the following three conversions according to the relationship among a value of output data D from the A/D converter unit 2, $D_{min}$, and $D_{max}$.

When $D<D_{min}$, $D'=0$

When $D_{min}<D<D_{max}$, $D'=255/(D_{max}-D_{min})*(D-D_{min})$

When $D_{max}<D$, $D'=255$ [1]

The CPU 11 calculates a D–D' conversion table based on equations [1] (see FIG. 11 or 14), and writes the calculation results in the conversion table memory 10.

The CPU 11 then switches the switch 6 to a converter 9 side to perform a scanning operation for outputting an image signal. In this case, the multi-value quantized data D from the A/D converter unit 2 is input to a converter 9, and is level-converted to data D' for changing a level between 0 to 255 according to the conversion table stored in the conversion table memory 10. Thereafter, the data D' is subjected to tone processing such as dither processing by a tone processing unit 5, and the processed data is then output.

Figure 12:
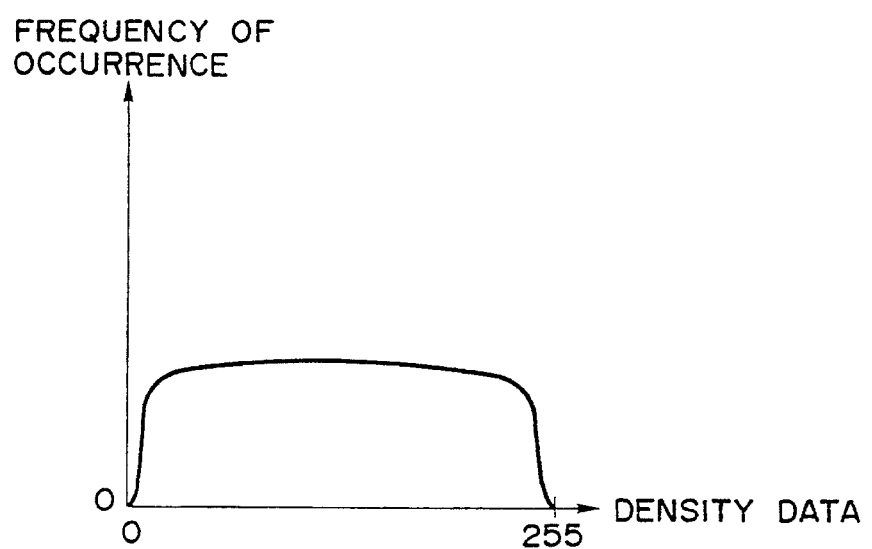
Figure 15:
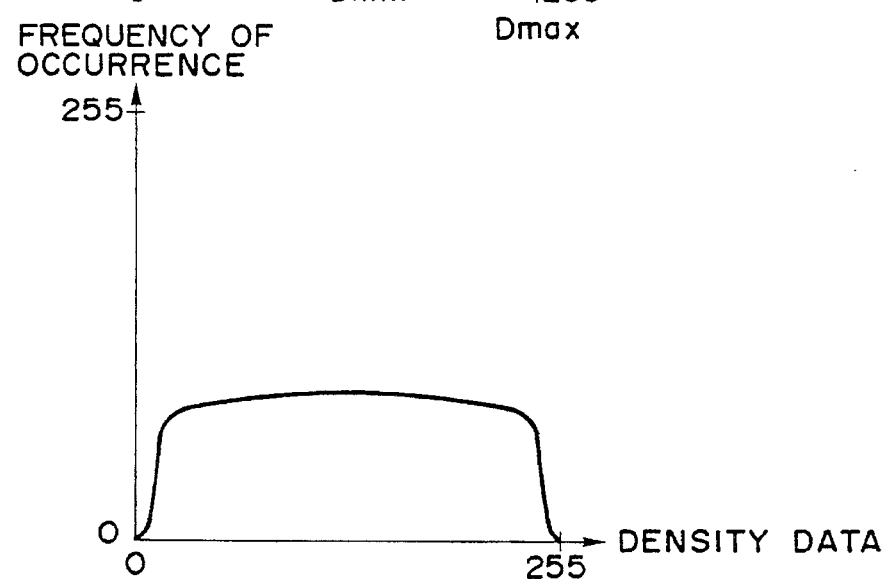

As a result, an image having the density histogram shown in FIG. 10 is level-converted according to the conversion table shown in FIG. 11, or an image having the density histogram shown in FIG. 13 is level-converted according to the conversion table shown in FIG. 14. Therefore, each of these image data is output as data D' as if it originally had a high-contrast density histogram having density levels falling within a range of 0 to 255, as shown in FIG. 12 or 15. That is, a high-contrast image can always be obtained from a low-contrast image.

Second Embodiment

Figure 16:
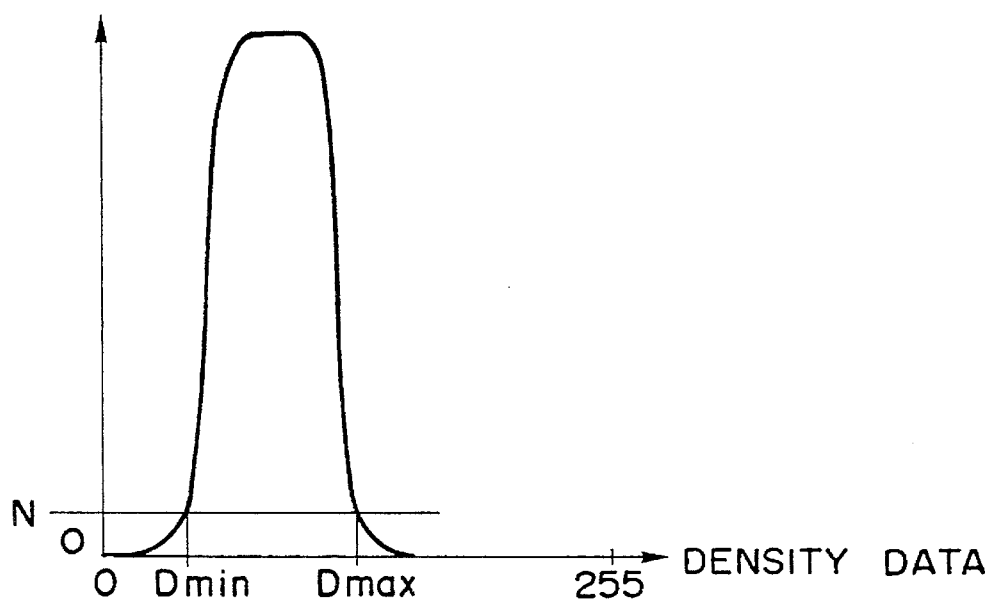
FIGS. 16 and 17 are graphs showing operations according to the second embodiment of the present invention.
Figure 17:
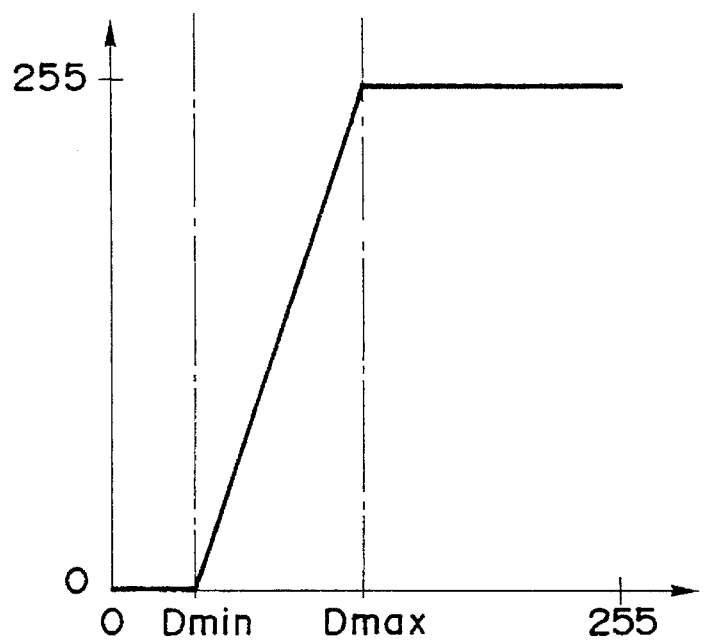

In the second embodiment, the CPU 11 detects $D_{max}$ and $D_{min}$ of a density whose frequency of appearance exceeds a predetermined value (N) from a density histogram generated by the prescanning operation like in the first embodiment, calculates a conversion table according to equations [1] using the detected densities, and outputs the calculated conversion table to the conversion table memory 10. FIGS. 16 and 17 show this state.

Thereafter, like in the first embodiment, level conversion is performed according to the conversion table stored in the conversion table memory 10, and tone processing such as dither processing is performed by the tone processing unit 5. In this embodiment, densities whose frequencies of appearance are below the predetermined value (N) are ignored in order to avoid level conversion errors caused by dust or scratches on an original. As the predetermined value (N), an appropriate amount is used according to a reading resolution of the image sensing unit 1 (e.g., a data volume per mm$^2$), and a minimum size to be read as a highest (or lowest) density region. This embodiment is effective to prevent level conversion from being influenced by dust or scratches when an enlarged projection image of, e.g., a microfilm is to be read.

Third Embodiment

Figure 18:
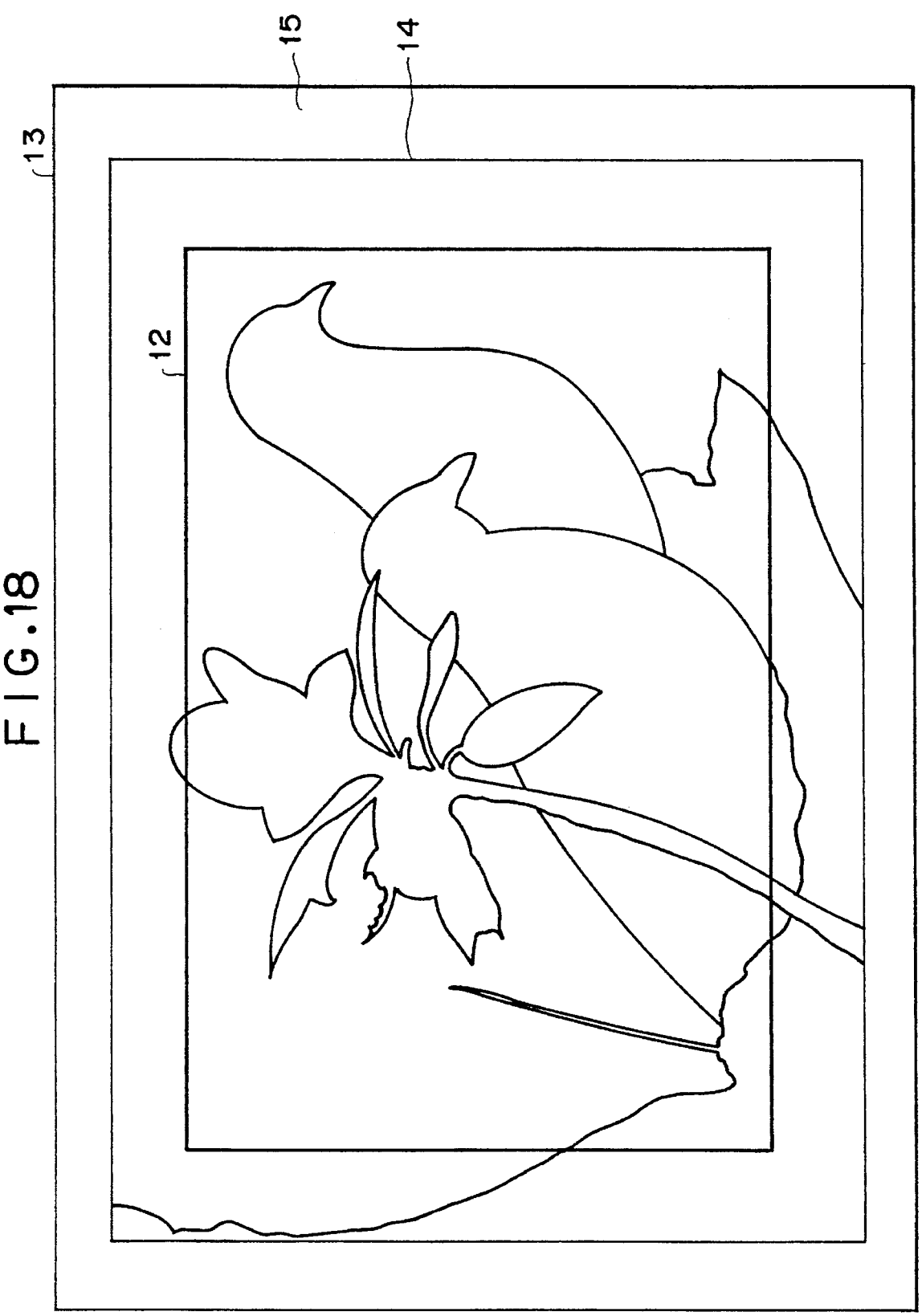
FIG. 18 is a view showing the third embodiment of the present invention.

In the third embodiment, when a density histogram is generated by the prescanning operation like in the first embodiment, a photometric region 12 is set at the central portion, and frequencies of appearance are counted in this region instead of counting frequencies of appearance of an entire reading region 13, as shown in FIG. 18.

A means for attaining this operation is realized by regulating a driving portion of a sensor such as a CCD included in the image sensing unit during the prescanning operation or by limiting a data input period to the adder 7 under the control of the CPU 11.

The CPU 11 looks up a density histogram generated for the central photometric region 12, and detects maximum and minimum densities $D_{max}$ and $D_{min}$ (or $D_{max}$ and $D_{min}$ for a density whose frequency of appearance exceeds a predetermined value as in the second embodiment). The CPU 11 then outputs a conversion table based on equations [1] using the detected $D_{max}$ and $D_{min}$ to the conversion table memory 10 like in the first embodiment. Thereafter, like in the first embodiment, level conversion is performed according to the conversion table stored in the conversion table memory 10, and tone processing such as dither processing is performed by the tone processing unit 5.

In this embodiment, when an original has a small size and is present not in the entire image to be read by the image sensing unit 1, as shown in FIG. 18 (in FIG. 18, 14 denotes an original), a level conversion error caused by a portion 15 having no original in the image to be read can be avoided.

As described above, according to the first to third embodiments, since a correspondence in conversion of a level conversion means is changed according to frequencies of appearance in units of density levels of an original, a high-contrast tone image can be obtained from a low-contrast original without impairing an original tone.

Fourth Embodiment

Figure 19:
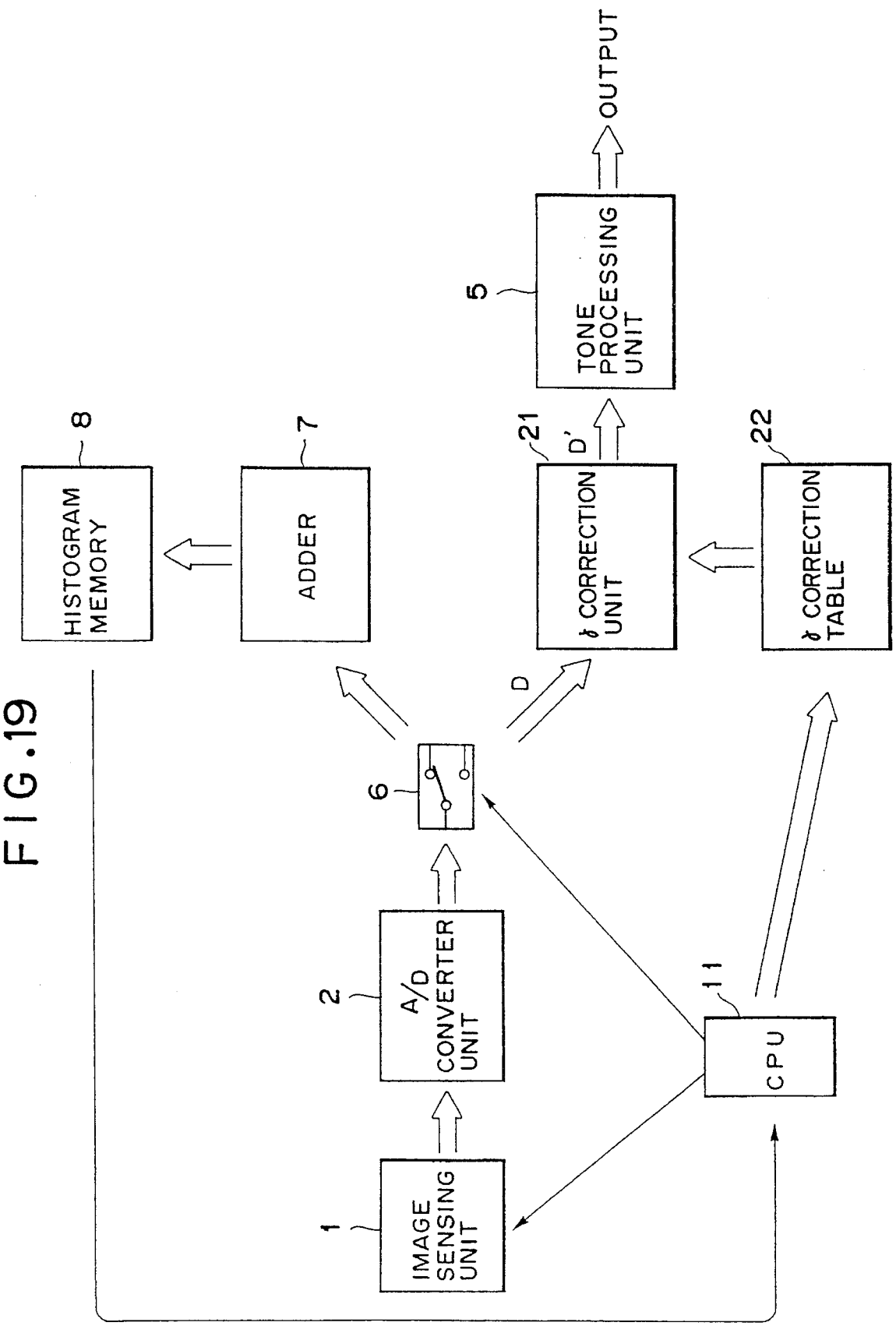
FIG. 19 is a block diagram of the fourth embodiment of the present invention.

FIG. 19 is a block diagram of the fourth embodiment. Note that the same reference numerals in FIG. 19 denote the same parts as in FIG. 9.

In this embodiment, a scanning operation for detecting frequencies of appearance of image densities (to be referred to as prescanning operation hereinafter) is performed prior to a scanning operation for outputting an image like in the first embodiment.

Control for scanning an original is performed by a CPU 11 by driving a scanning system and an exposure system (neither are shown) for guiding image light from an original to an image sensing unit 1. Scanning and exposure arrangements and control are known to those who are skilled in the art, and a detailed description thereof will be omitted.

An analog image signal obtained by photoelectrically converting image light from an original by the image sensing unit 1 including an image sensing element such as a CCD is quantized into multi-value data by an A/D converter unit 2. Note that the A/D converter unit 2 outputs white level as a value "0", and outputs black level as a value "255". In the prescanning mode, a switch 6 is set at an adder 7 side under the control of the CPU 11.

Figure 22A:
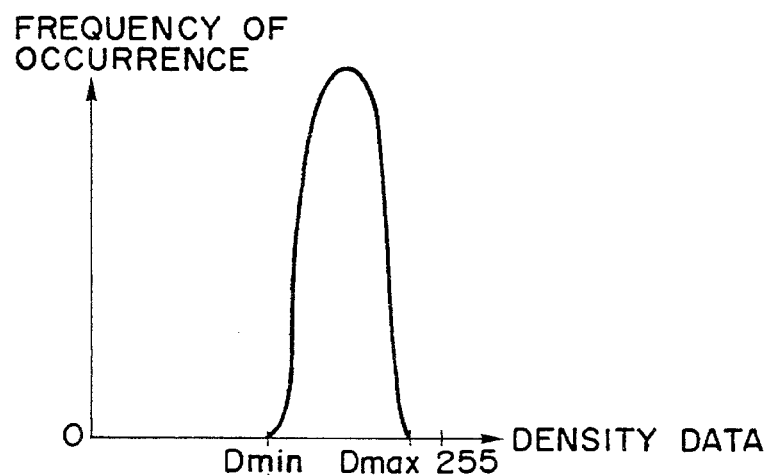

The multi-value quantized data is input to the adder 7 to count frequencies of appearance in units of densities (to be referred to as a density histogram hereinafter). The count value is stored in a histogram memory 8. FIGS. 20A and 22A show contents of the histogram memory 8. FIG. 20A shows a density histogram of an image which entirely has a low density and a low contrast. FIG. 22A shows a density histogram of an image which entirely has a high density and a low contrast.

Upon completion of the prescanning operation, the CPU 11 looks up the content of the histogram memory 8, and outputs a correction table to a γ correction table 22. FIGS. 20B and 20C and FIGS. 22B and 22C show this state.

More specifically, as shown in FIGS. 20A and 22A, if minimum and maximum densities appearing in an original are respectively represented by $D_{min}$ and $D_{max}$, the CPU 11 looks up the histogram memory 8 to detect these $D_{min}$ and $D_{max}$, and calculates a conversion table for performing the following three conversions according to the relationship among a value of output data D from the A/D converter unit 2, $D_{min}$, and $D_{max}$.

When $D<D_{min}$, $D'=0$

When $D_{min}<D<D_{max}$, $D'=F\{255/(D_{max}-D_{min})*(D-D_{min})\}$

When $D_{max}<D$, $D'=255$   [2]

Figure 22B:
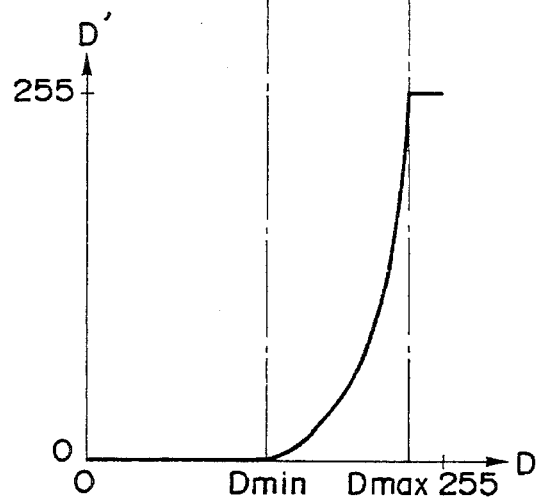

The CPU 11 calculates a γ conversion table for D–D' conversion on the basis of equations [2] (see FIG. 20B or 22B).

Figure 22C:
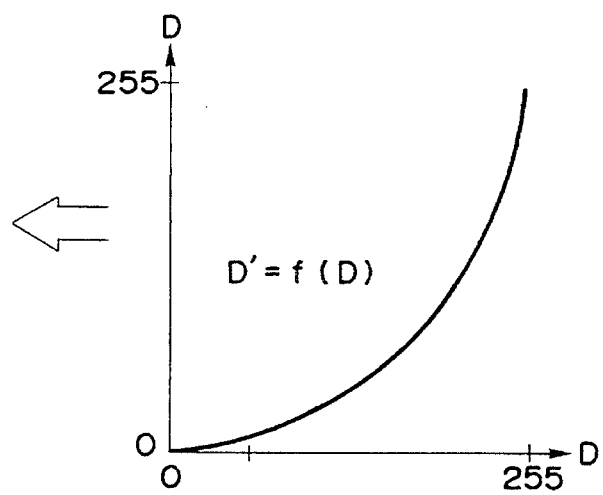

A function F(D) is a conventional γ correction function shown in FIG. 20C or 22C. In this embodiment, this function is compressed to fall within a range of densities present in an original, as shown in FIG. 20B or 22B.

In this manner, the calculation result is written in the γ conversion table 22.

The CPU 11 switches the switch 6 to a γ correction unit 21 side to perform a scanning operation for outputting an image signal. In this case, the multi-value quantized data D from the A/D converter unit 2 is input to the γ correction unit 21, and is then γ-corrected according to the γ correction table 22. The γ-corrected data is then subjected to tone processing such as dither processing by a tone processing unit 5, and the processed data is then output.

Figure 21:
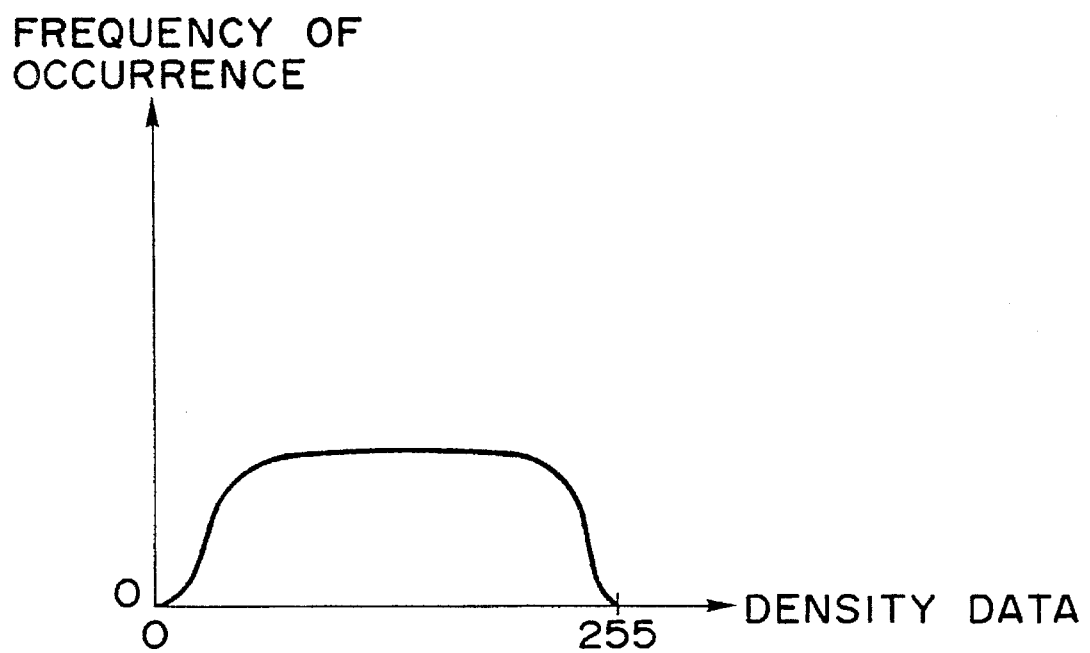
FIGS. 21 and 23 show density histograms representing the effect of the fourth embodiment.
Figure 23:
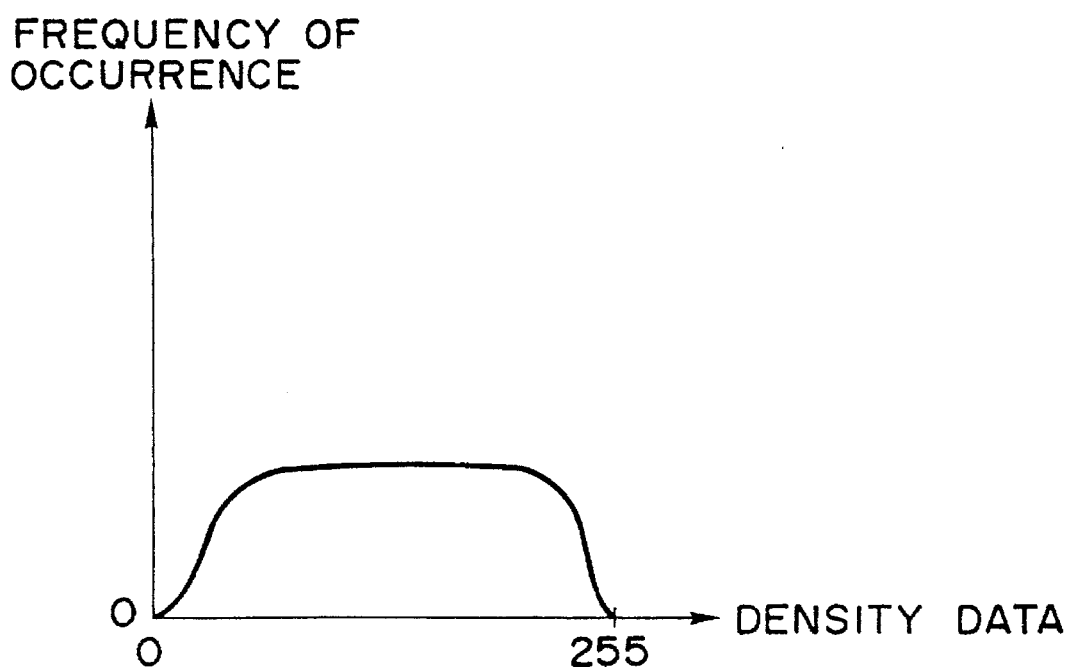

As a result, an image having a density histogram shown in FIG. 20A is tone-converted according to the γ correction table shown in FIG. 20B, or an image having a density histogram shown in FIG. 22A is tone-converted according to the γ correction table shown in FIG. 22B. Therefore, each of these image data is output as data D' as if it originally had a high-contrast density histogram, as shown in FIG. 21 or 23. More specifically, a reproduced image having a high contrast and is properly density-converted can always be obtained from a low-contrast original image.

Fifth Embodiment

Figure 24A:
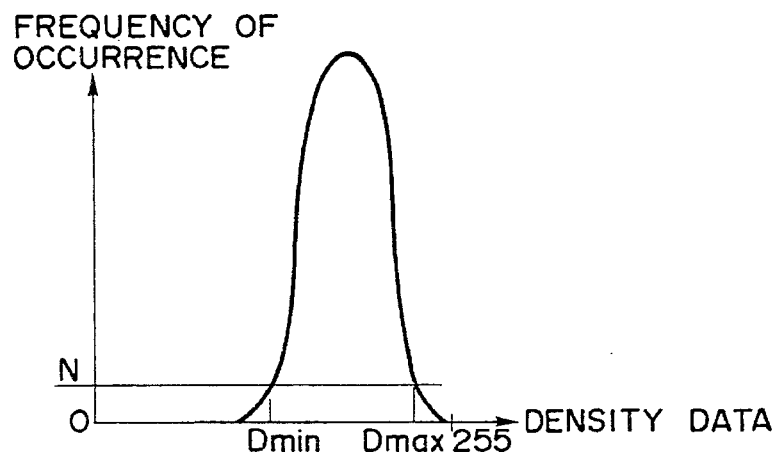
FIGS. 24A to 24C are graphs for explaining tone correction according to the fifth embodiment of the present invention.
Figure 24B:
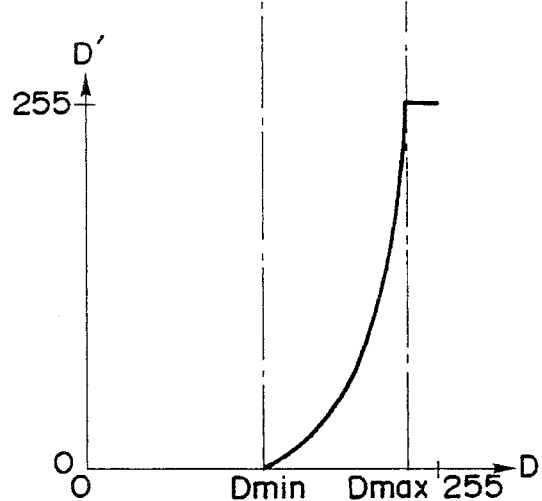
Figure 24C:
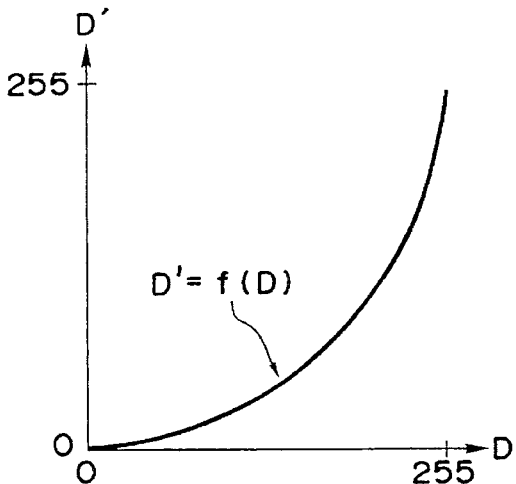

In this embodiment, the CPU 11 detects $D_{max}$ and $D_{min}$ of a density whose frequency of appearance exceeds a predetermined value (N) from a density histogram generated by the prescanning operation like in the fourth embodiment, calculates a correction table according to equations [2] using the detected densities, and outputs the calculated correction table to the γ correction table 22. FIGS. 24A and 24B show this state.

Thereafter, like in the fourth embodiment, level conversion is performed according to the correction data stored in the γ correction table 22, and tone processing such as dither processing is performed by the tone processing unit 5.

In this embodiment, densities whose frequencies of appearance are below the predetermined value (N) are ignored in order to avoid level conversion errors caused by dust or scratches on an original. As the predetermined value N), an appropriate amount is used according to reading resolution of the image sensing unit 1 (e.g., a data volume per mm²), and a minimum size to be read as a highest (or lowest) density region. This embodiment is effective to prevent level conversion from being influenced by dust or scratches when an enlarged projection image of, e.g., a microfilm is to be read.

Sixth Embodiment

Figure 25:
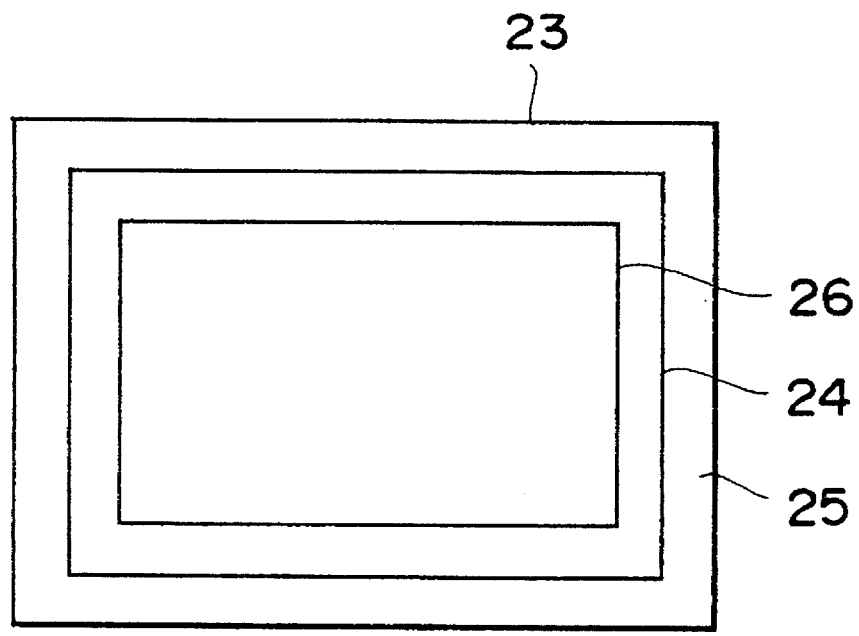
FIG. 25 is a view for explaining an original reading range.

In this embodiment, when a density histogram is generated by the prescanning operation like in the fourth embodiment, a photometric region 26 is set at the central portion, and frequencies of appearance are counted in this region instead of counting frequencies of appearance of an entire reading region 23, as shown in FIG. 25.

A means for attaining this operation is realized by regulating a driving portion of a sensor such as a CCD included in the image sensing unit during the prescanning operation or by limiting a data input period to the adder 7 under the control of the CPU 11.

The CPU 11 looks up a density histogram generated for the central photometric region 26, and detects maximum and minimum densities $D_{max}$ and $D_{min}$ (or $D_{max}$ and $D_{min}$ for a density whose frequency of appearance exceeds a predetermined value as in the fifth embodiment). The CPU 11 then outputs correction data based on equations [2] using the detected $D_{max}$ and $D_{min}$ to the γ correction table 22 like in the fourth embodiment.

Thereafter, like in the fourth embodiment, level conversion is performed according to the γ correction table 22, and tone processing such as dither processing is performed by the gone processing unit 5.

In this embodiment, when an original has a small size and is present not in the entire image to be read by the image sensing unit 1, as shown in FIG. 25 (in FIG. 25, 24 denotes an original), a level conversion error caused by a portion 25 having no original in the image to be read can be avoided.

As described above, according to the fourth to sixth embodiments, Since the way of tone correction is changed according to frequencies of appearance in units of density levels of an original, a high-contrast tone image can be obtained from a low-contrast original without impairing an original tone. Since tone correction is performed using a conventional γ correction mechanism, a mechanism to be added can be minimized.

Seventh Embodiment

Figure 26:
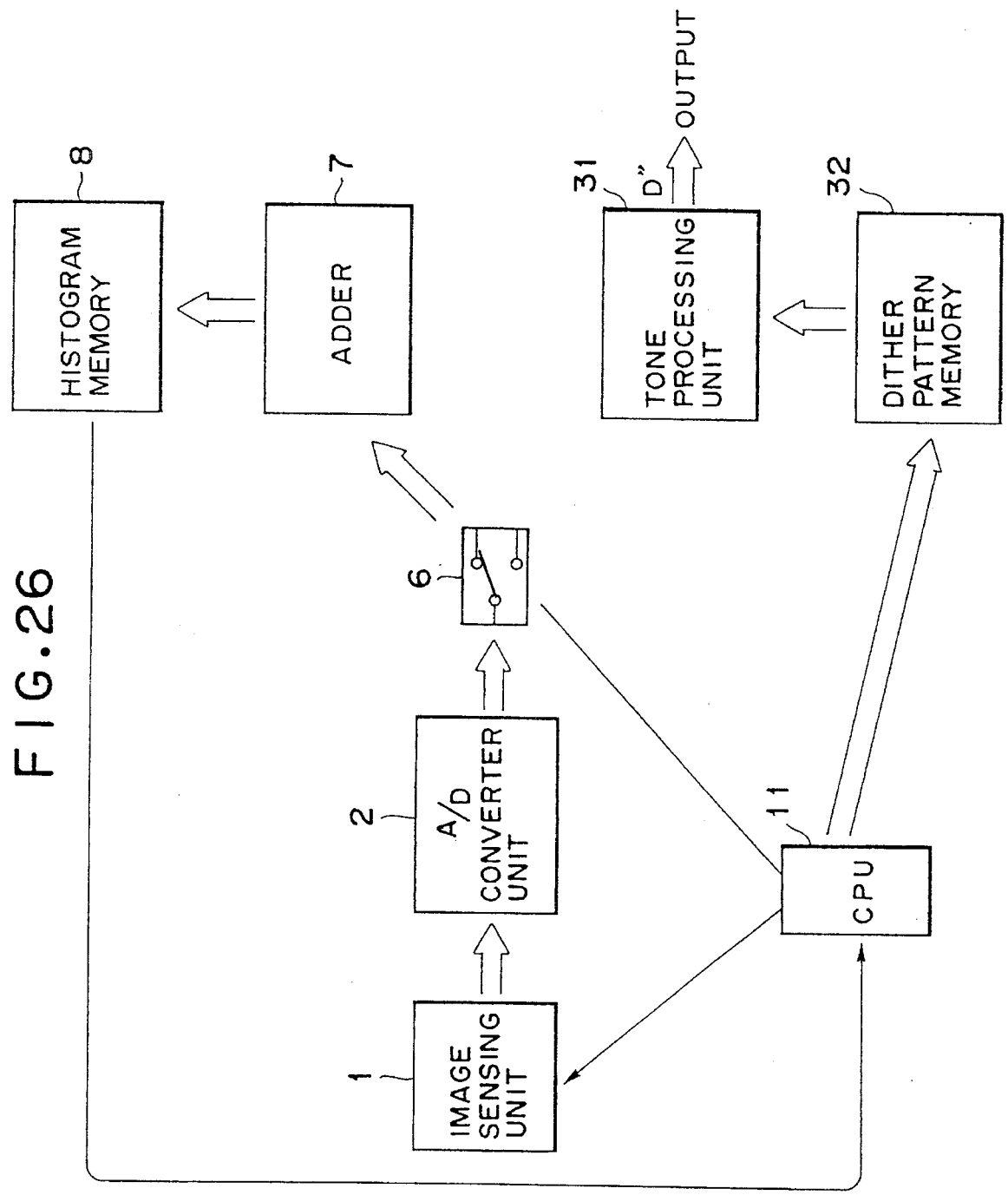
FIG. 26 is a block diagram showing the seventh embodiment of the present invention.

FIG. 26 shows the seventh embodiment of the present invention.

The same reference numerals in FIG. 26 denote the same parts as in FIG. 9. An adder 7 serves as an appearance frequency detection means, and detects a frequency of appearance of each density level (to be referred to as a density histogram hereinafter). A histogram memory 8 stores a density histogram obtained by the adder 7. A CPU 11 determines dither patterns used in halftone processing of an image on the basis of the histogram stored in the histogram memory 8. A dither pattern memory 32 stores determined dither patterns. A tone processing unit 31 performs tone processing to obtain all the predetermined density levels on the basis of the dither patterns stored in the dither pattern memory 32. A switch 6 switches data from an A/D converter unit 2 to the adder 7 side in the prescanning mode, and switches it to the tone processing unit 31 side in the scanning mode.

An image reading apparatus of this embodiment performs a scanning operation for detecting a frequency of appearance of each density level (to be referred to as a prescanning operation) prior to a scanning operation for outputting image data.

Figure 39:
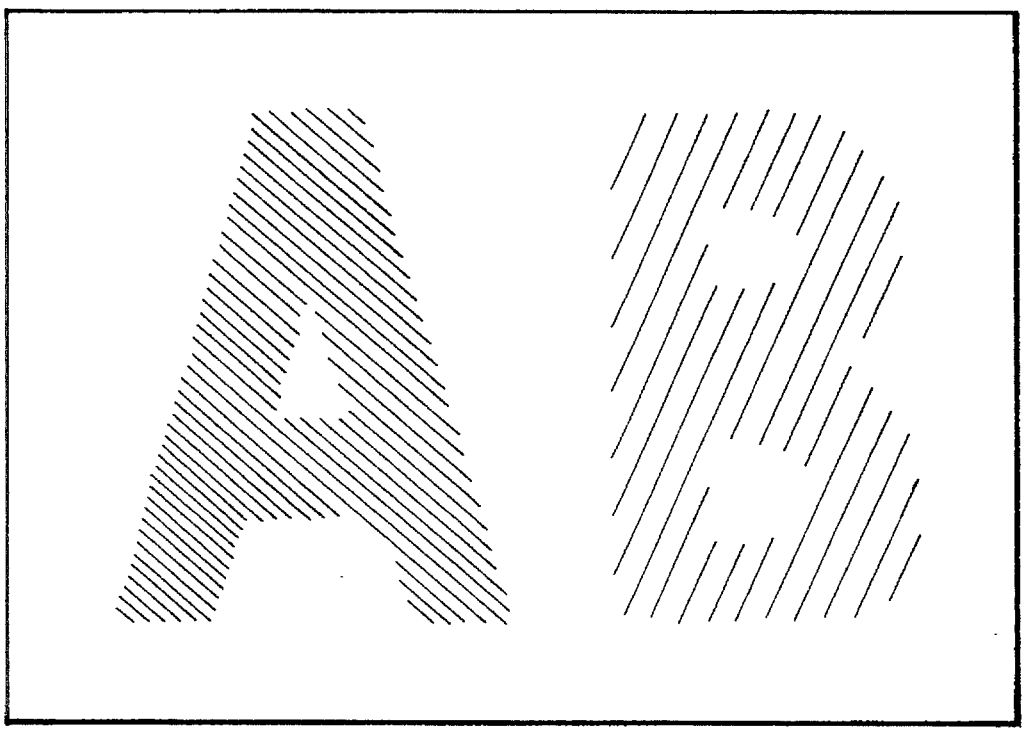
FIGS. 39 and 40 show images.

(1) A control sequence executed by the CPU 11 when an image which entirely has a low density and a low contrast, as shown in FIG. 39, is to be reproduced will be described below.

In this case, a dither pattern having 4×4=16 tone levels is used.

Figure 27:
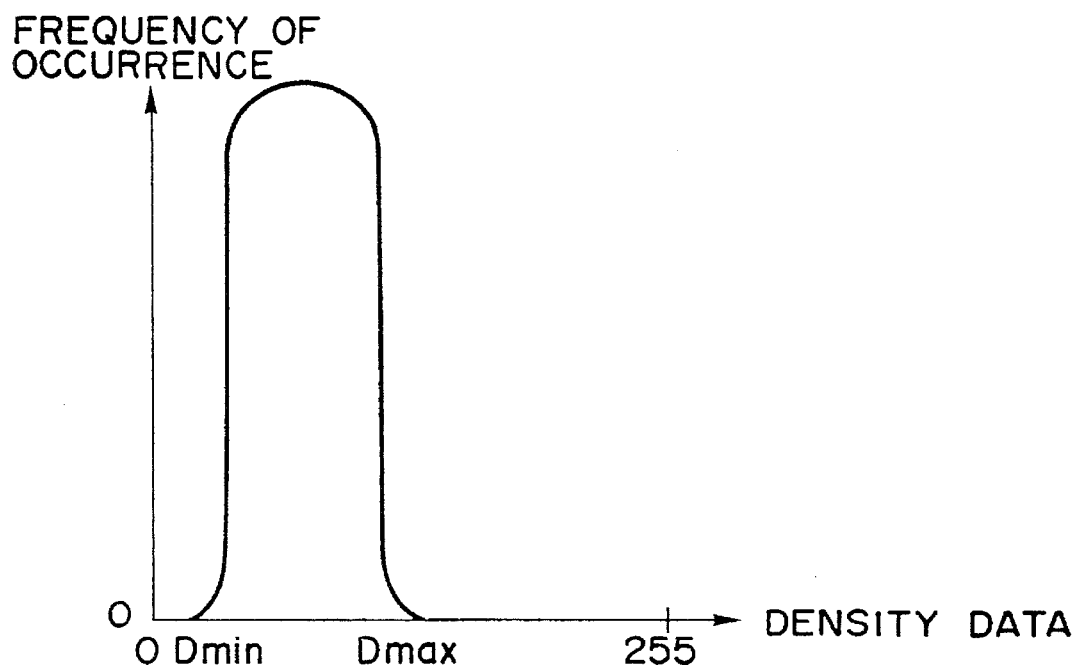
FIGS. 27, 29, 30, and 32 show density histograms showing frequencies of appearance of density levels of images.

A density histogram obtained by the prescanning operation is as shown in FIG. 27, and is stored in the histogram memory 8.

Figure 28:
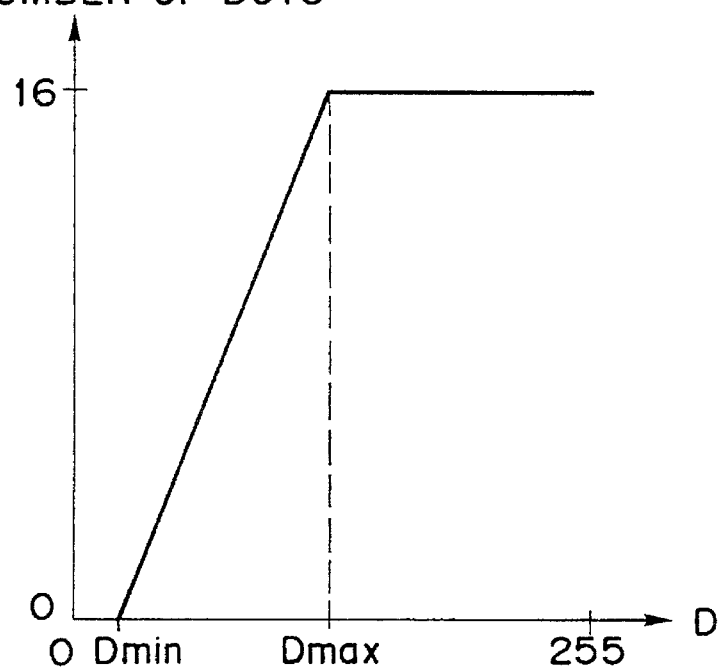
FIGS. 28 and 31 show dither patterns corresponding to the density histograms.

Upon completion of the prescanning operation, the dither patterns having characteristics shown in FIG. 28 are stored in the dither pattern memory 32 with reference to the content of the histogram memory 8.

More specifically, minimum and maximum densities $D_{min}$ and $D_{max}$ of an original are detected with reference to the histogram memory 8. Dither patterns for converting density data into dot numbers according to three conditions shown in Table 1 below in correspondence with the relationship among density data D, $D_{max}$ and $D_{min}$ are written in the dither pattern memory 32.

TABLE 1

| D | Dot Number |
| --- | --- |
| $D \leq D_{min}$ | 0 |
| $D_{min} < D < D_{max}$ | $16/(D_{max} - D_{min}) * (D - D_{min})$ |
| $D_{max} \leq D$ | 16 |

Figure 29:
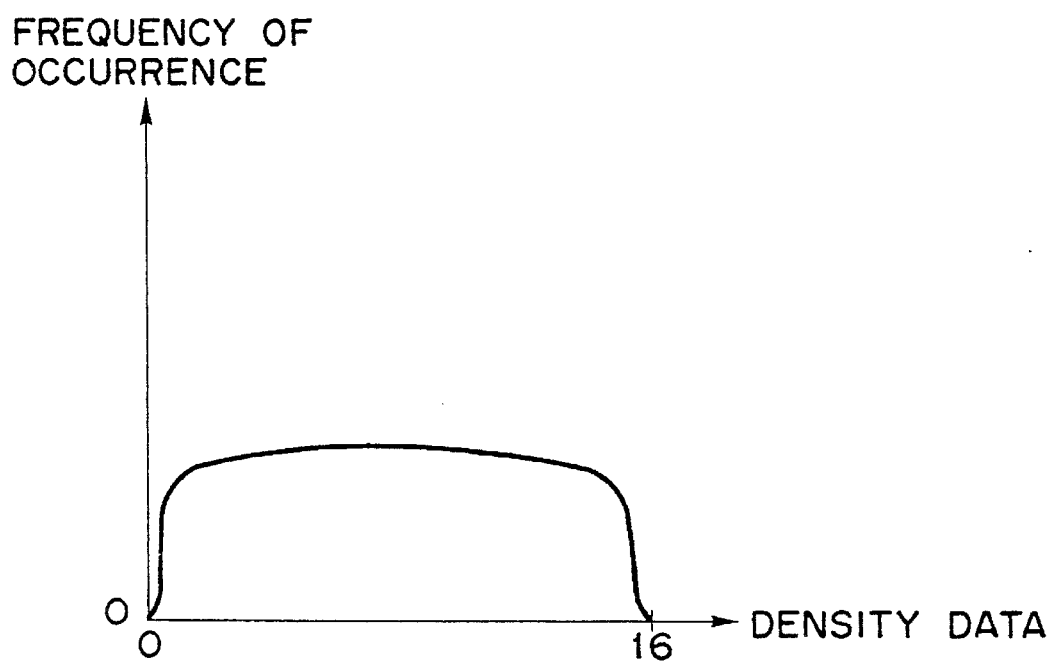
Figure 30:
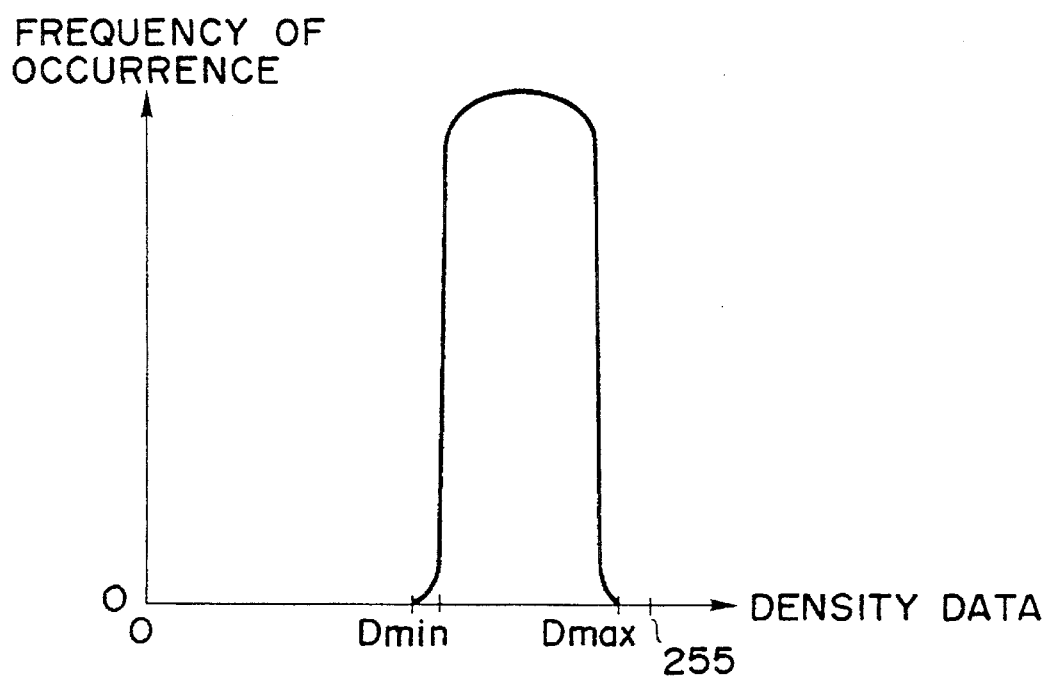
Figure 33:
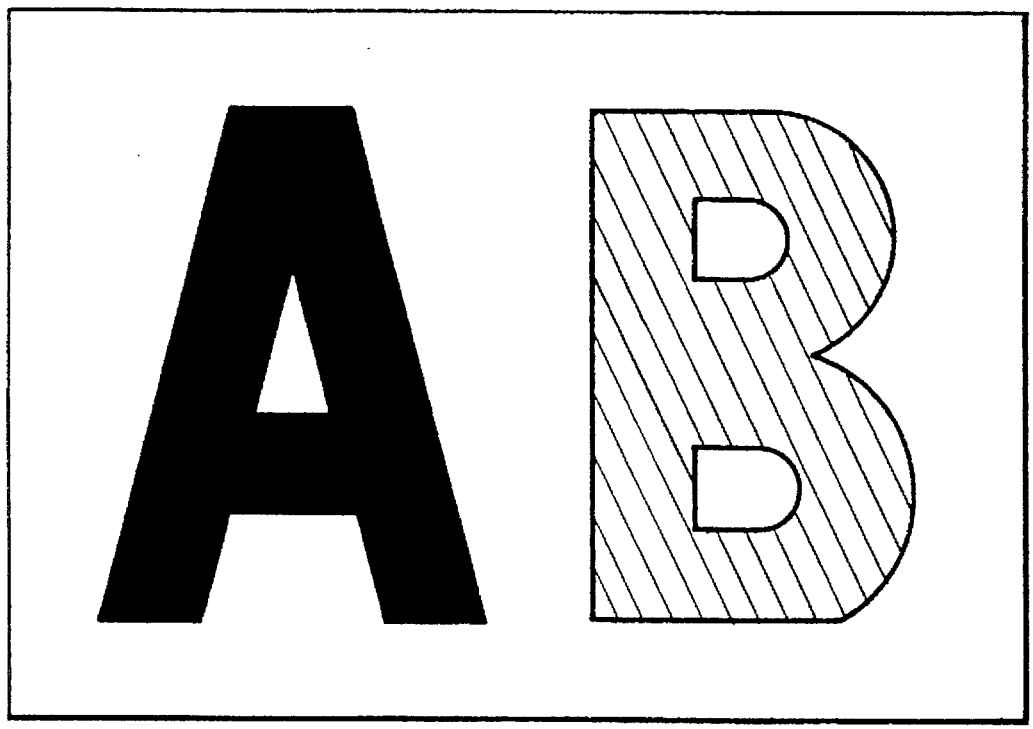
FIG. 33 shows an image obtained by converting an image with dither patterns.

The CPU 11 then switches the switch 6 from the adder 7 side to the tone processing unit 31 side, and starts a scanning operation for outputting an image signal. The multi-value quantized data from the A/D converter unit 2 is input to the tone processing unit 31. The tone processing unit 31 converts density data into dot numbers according to the dither patterns stored in the dither pattern memory 32, so that the dot numbers have a density histogram shown in FIG. 29, and outputs an image shown in FIG. 33.

Figure 40:
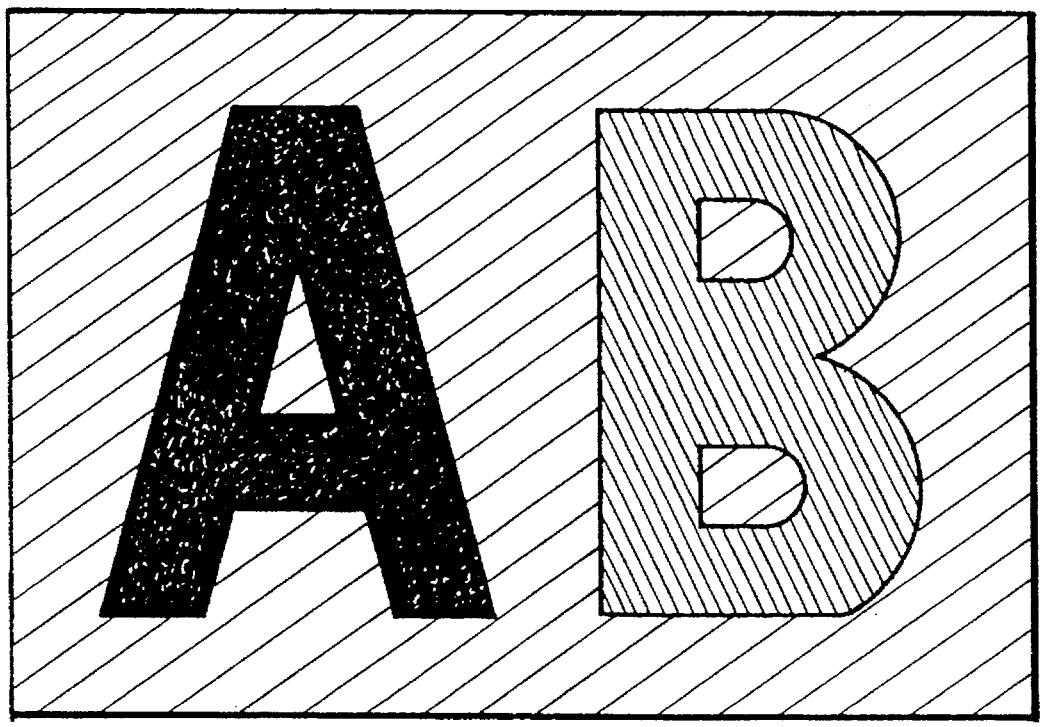

(2) A control sequence executed by the CPU 11 when an image which entirely has a high density and a low contrast, as shown in FIG. 40, is to be reproduced will be described below.

Figure 31:
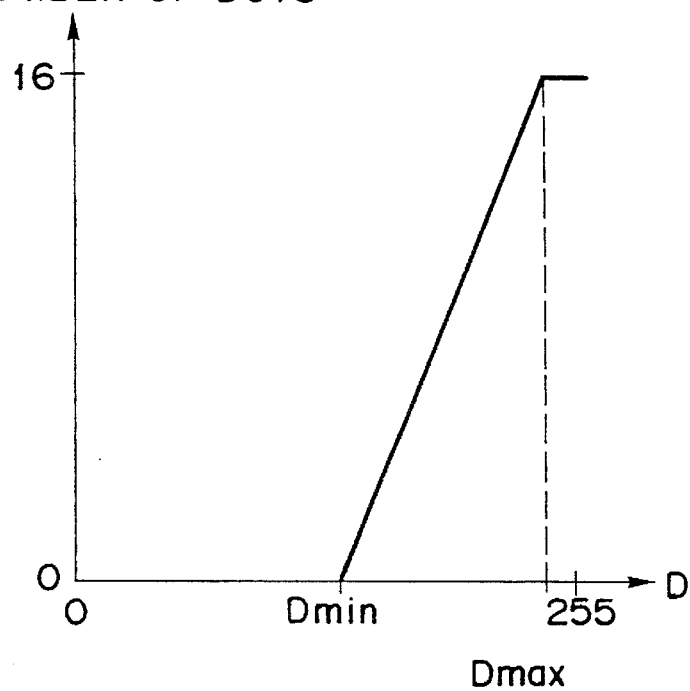
Figure 32:
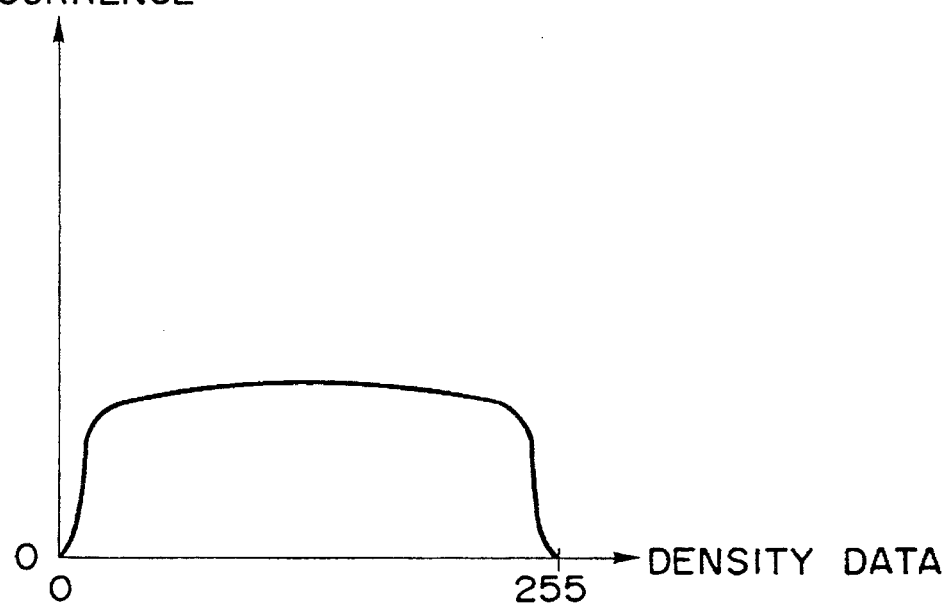

In comparison with the case (1) described above, a dither pattern to De stored in the dither pattern memory 32 is different. More specifically, a dither pattern having characteristics shown in FIG. 28 is used in the case (1), while a dither pattern having characteristics shown in FIG. 31 is used in this case. The operation and effect in this case are essentially the same as those in the case (1). In this case, an image shown in FIG. 33 can be output.

Eighth Embodiment

Figure 34:
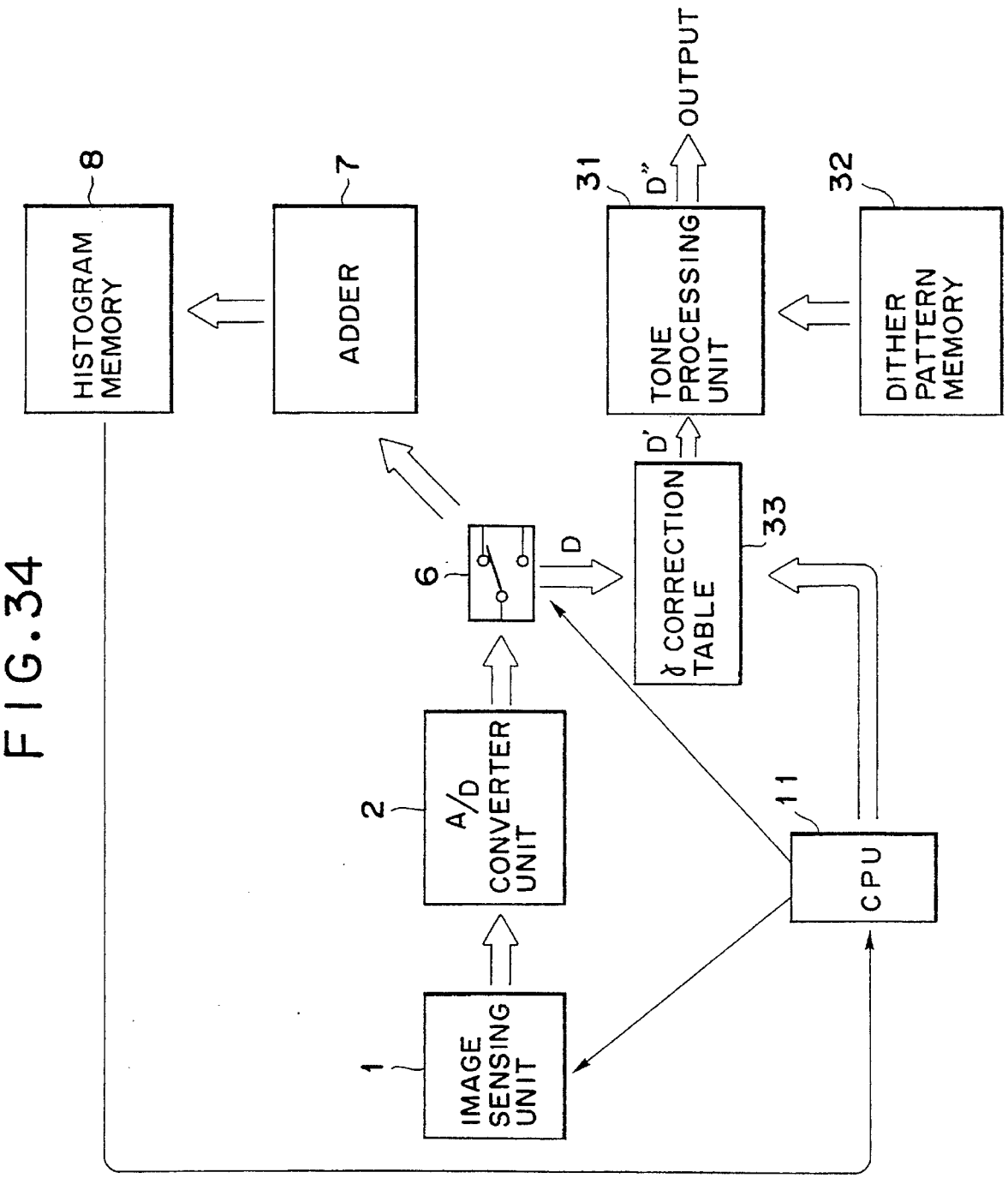
FIG. 34 is a block diagram showing the eighth embodiment of the present invention.
Figure 35:
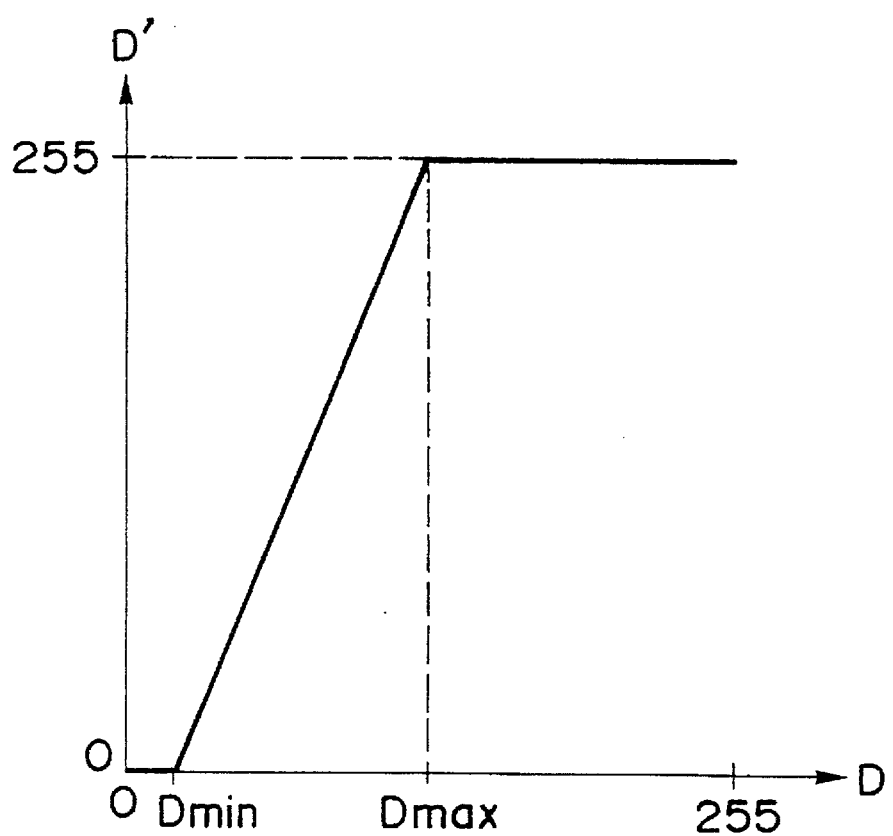
FIG. 35 is a graph showing an I/O relationship of a γ conversion unit.

In the seventh embodiment, the CPU 11 rewrites the content of the dither pattern memory 32 with reference to the histogram memory 8. Alternatively, a γ conversion unit 33 having a γ conversion table memory whose I/O relationship can be rewritten by the CPU 11 is arranged between the switch 6 and the tone processing unit 31, as shown in FIG. 34, so that the content of the dither pattern memory 32 is fixed, and the content of the γ conversion table memory may be rewritten to have an I/O relationship shown in FIG. 35.

The tone processing unit 31 need not always employ a dither method, but may employ other tone expression methods, e.g., a known error diffusion method.

Ninth Embodiment

Figure 36:
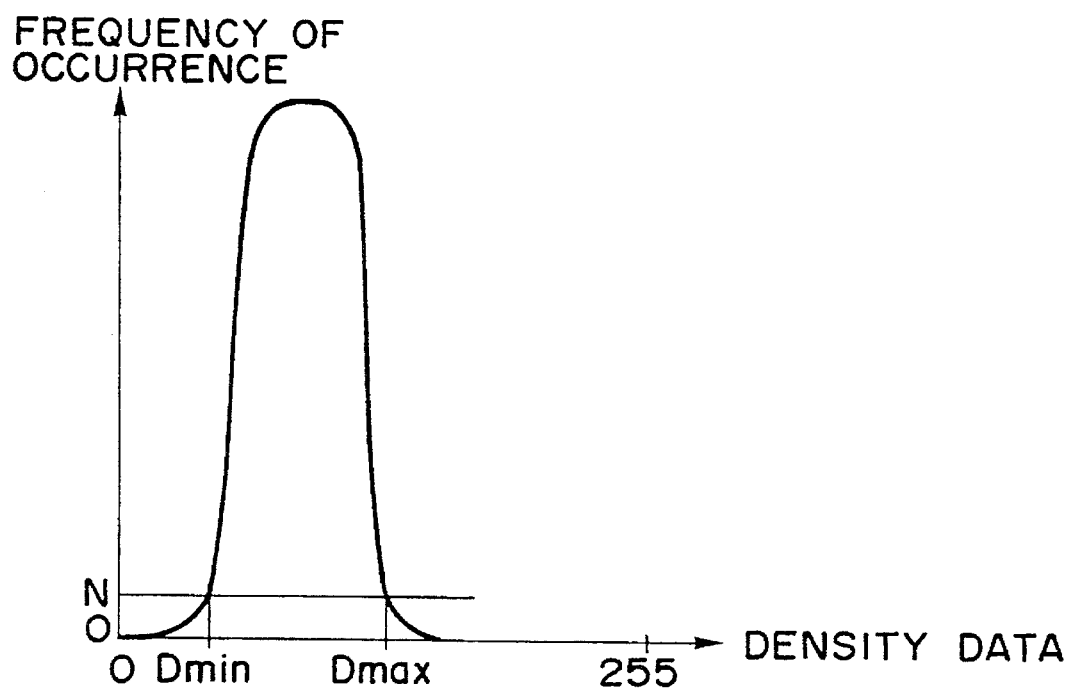
FIG. 36 is a graph for explaining a method of determining maximum and minimum densities $D_{max}$ and $D_{min}$ according to the ninth embodiment of the present invention.
Figure 37:
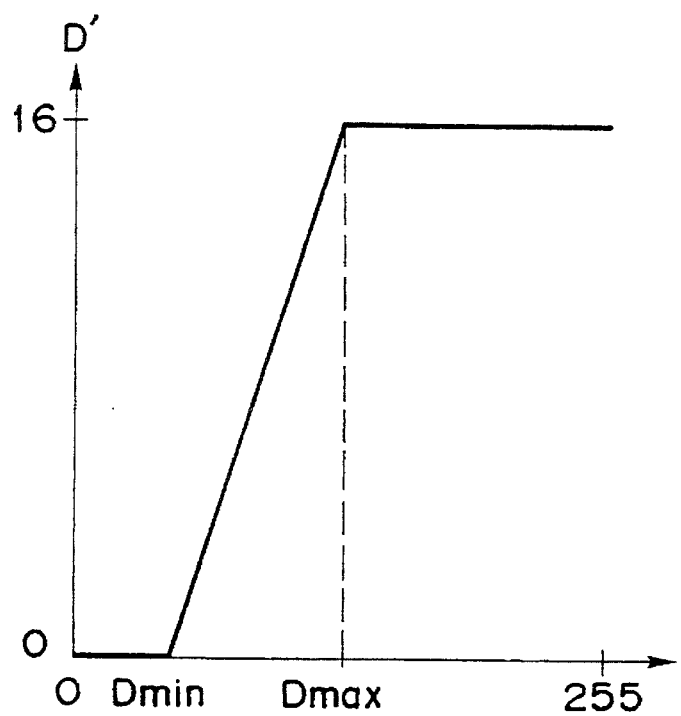
FIG. 37 shows a dither pattern according to the ninth embodiment of the present invention.

In this embodiment, upon comparison with the seventh embodiment, a dither pattern to be stored in the dither pattern memory 32 is different. More specifically, in the seventh embodiment, a maximum density of an original corresponds to 16 dots as a maximum density $D_{max}$, and a minimum density corresponds to 0 dot as a minimum density $D_{min}$. However, in this embodiment, as shown in FIGS. 36 and 37, a maximum density of densities which are generated a predetermined number of times (N) or more corresponds to 16 dots as the maximum density $D_{max}$, and a minimum density of densities which are generated the predetermined number of times (N) or more corresponds to 0 dot as the minimum density $D_{min}$. As the value N, an appropriate amount is used according to a reading resolution of the image sensing unit 1 (e.g., a data volume per mm$^2$), and a minimum size to be read as a highest (or lowest) density region. In this manner, the operation and effect of this embodiment are the same as those in the first embodiment. In addition, this embodiment is advantageous to prevent level conversion from being influenced by dust or scratches when an enlarged projection image of, e.g., a microfilm is to be read.

Tenth Embodiment

Figure 38:
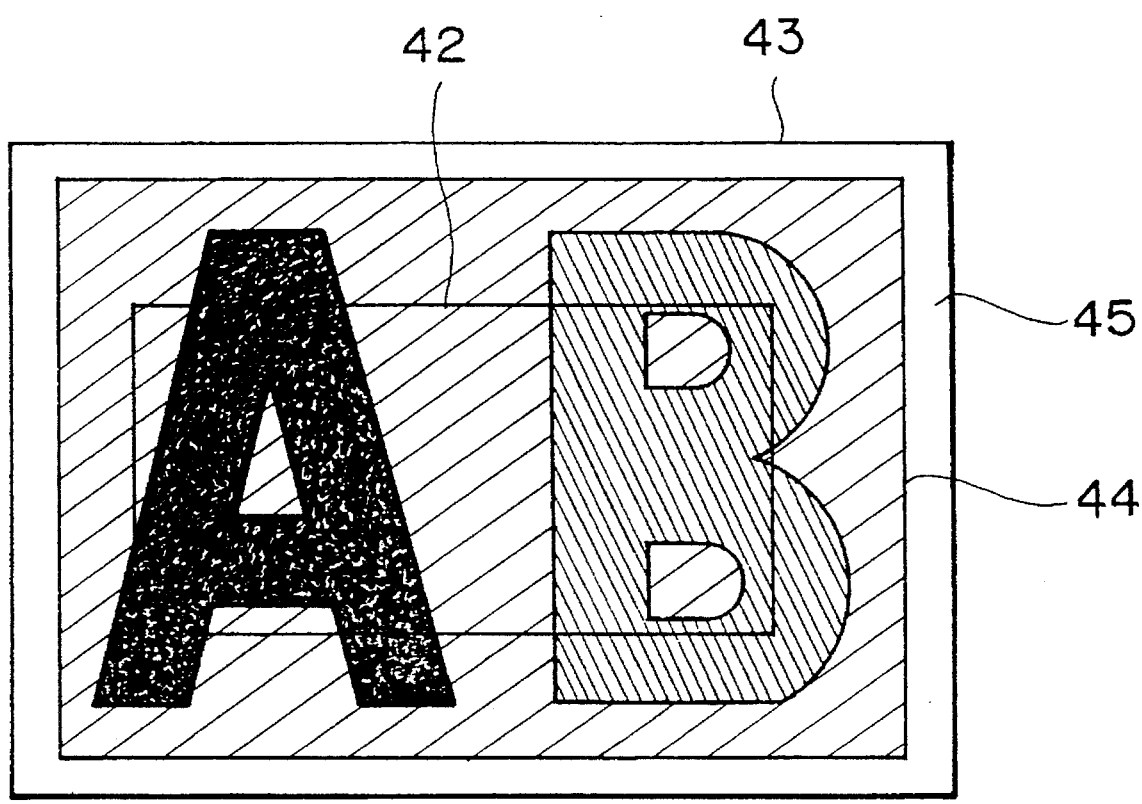
FIG. 38 shows a region on an original from which frequencies of appearance of density levels are detected according to the tenth embodiment of the present invention.

In this embodiment, upon comparison with the seventh embodiment, a region on an original for detecting a frequency of appearance of each density level is different. More specifically, in the seventh embodiment, such a detection region corresponds to the entire original shown in FIG. 38. In this embodiment, however, such a detection region corresponds to a central photometric region 42. In this manner, the operation and effect of this embodiment are the same as those in the seventh embodiment. In addition, when an original 44 is present not in the entire image to be read, appropriate tone conversion can be performed.

As described above, according to the seventh to tenth embodiments, a high-contrast tone image can be obtained from a low-contrast original without impairing an original tone.

Some preferred embodiments of the present invention have been described. However, the present invention is not limited to these embodiments, and various other changes and modifications may be made within the scope of claims.

What is claimed is:

1. An image reading apparatus comprising:

reading means for photoelectrically reading an original image, and outputting an image signal;

conversion means for converting the image signal from said reading means into density data representing density levels of a plurality of steps;

detection means for detecting frequencies of appearance in units of density levels of the density data from said conversion means, said detection means detecting the frequencies of appearance of density levels in a specific image area which is not an entire original image but a central portion of the original image; and correction means for correcting the density levels expressed by the density data from said conversion means on the basis of the frequencies of appearance detected by said detection means, wherein said correction means detects a minimum density level and a maximum density level among density levels of which frequencies of appearance are higher than a predetermined frequency; and corrects the density levels expressed by the density data on the basis of the detected minimum and maximum density levels.

2. An apparatus according to claim 1, wherein said correction means corrects the density levels so that the density data express all the density levels.

3. An apparatus according to claim 1, wherein said correction means performs correction of the density data using nonlinear conversion characteristics.

4. An apparatus according to claim 1, further comprising forming means for forming image data for reproducing a halftone image on the basis of the density data whose density levels are corrected by said correction means.

5. An image reading method comprising steps of:

photoelectrically reading an original image, and outputting an image signal;

converting the image signal into density data representing density levels of a plurality of steps;

detecting frequencies of appearance in units of density levels of the density data, said detecting step detecting frequencies of appearance of density levels in a specific image area which is not an entire original image but a central portion of the original image; and correcting the density levels expressed by the density data on the basis of the frequencies of appearance, wherein, in said correcting step, a minimum density level and a maximum density level are detected among density levels of which frequencies of appearance are higher than a predetermined frequency, and the density levels expressed by the density data are corrected on the basis of the detected minimum and maximum density levels.

6. An image processing apparatus comprising:

input means for inputting an image signal representing an original image;

conversion means for converting the image signal from said input means into density data representing density levels of a plurality of steps;

detection means for detecting frequencies of appearance in units of density levels of the density data from said conversion means, said detection means detecting the frequencies of appearance of density levels in a specific image area which is not an entire original image but a central portion of the original image; and correction means for correcting the density levels expressed by the density data from said conversion means on the basis of the frequencies of appearance detected by said detection means, wherein said correction means detects a minimum density level and a maximum density level among density levels of which frequencies of appearance are higher than a predetermined frequency, and corrects the density levels expressed by the density data on the basis of the detected minimum and maximum density levels.

7. An apparatus according to claim 6, wherein said correction means corrects the density levels so that the density data expresses all the density levels.

8. An apparatus according to claim 6, wherein said correction means performs correction of the density data using nonlinear conversion characteristics.

9. An apparatus according to claim 6, further comprising forming means for forming image data for reproducing a halftone image on the basis of the density data whose density levels are corrected by said correction means.

10. An apparatus according to claim 6, wherein said input means inputs the image signal from reading means which photoelectrically reads the original image.

11. An image processing method comprising steps of:

inputting an image signal representing an original image;

converting the image signal into density data representing density levels of a plurality of steps;

detecting frequencies of appearance in units of density levels of the density data, said detecting step detecting frequencies of appearance of density levels in a specific image area which is not an entire original image but a central portion of the original image; and correcting the density levels expressed by the density data on the basis of the frequencies of appearance, wherein, in said correcting step, a minimum density level and a maximum density level are detected among density levels of which frequencies of appearance are higher than a predetermined frequency, and the density levels expressed by the density data are corrected on the basis of the detected minimum and maximum density levels.

* * * * *

UNITED STATES PATENT AND TRADEMARK OFFICE
CERTIFICATE OF CORRECTION

PATENT NO. : 5,608,823
DATED : March 4, 1997
INVENTOR(S) : KAZUO OHTANI

It is certified that error appears in the above-identified patent and that said Letters Patent is hereby corrected as shown below:

<u>COLUMN 7</u>

Line 39, "Since" should read --since--.

<u>COLUMN 8</u>

Line 44, "De" should read --be--.

Signed and Sealed this

Twelfth Day of August, 1997

Attest:

BRUCE LEHMAN

Attesting Officer

Commissioner of Patents and Trademarks